United States Patent
Li et al.

(10) Patent No.: US 10,932,313 B2
(45) Date of Patent: Feb. 23, 2021

(54) WIRELESS CONNECTION SWITCHING METHOD AND TERMINAL

(71) Applicant: HUAWEI TECHNOLOGIES CO., LTD., Shenzhen (CN)

(72) Inventors: Jiaxin Li, Shanghai (CN); Jian Chen, Shanghai (CN); Jun Yang, Shenzhen (CN); Jing Qian, Shanghai (CN); Yaoying Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/472,902

(22) PCT Filed: Feb. 24, 2017

(86) PCT No.: PCT/CN2017/074769
§ 371 (c)(1),
(2) Date: Jun. 24, 2019

(87) PCT Pub. No.: WO2018/113086
PCT Pub. Date: Jun. 28, 2018

(65) Prior Publication Data
US 2020/0092926 A1    Mar. 19, 2020

(30) Foreign Application Priority Data

Dec. 24, 2016  (CN) .......................... 201611210218.5

(51) Int. Cl.
*H04W 76/15* (2018.01)
*H04W 76/14* (2018.01)
(Continued)

(52) U.S. Cl.
CPC .......... *H04W 76/15* (2018.02); *H04W 8/005* (2013.01); *H04W 76/14* (2018.02); *H04W 88/06* (2013.01)

(58) Field of Classification Search
CPC ..... H04W 76/14; H04W 76/15; H04W 76/16; H04W 76/23; H04W 88/06; H04L 69/24
See application file for complete search history.

(56) References Cited

U.S. PATENT DOCUMENTS

2009/0111378 A1    4/2009  Sheynman et al.
2012/0258658 A1    10/2012  Matsuo
(Continued)

FOREIGN PATENT DOCUMENTS

CN    101843124 A    9/2010
CN    103138806 A    6/2013
(Continued)

*Primary Examiner* — Pao Sinkantarakorn
(74) *Attorney, Agent, or Firm* — Kilpatrick Townsend & Stockton LLP

(57) ABSTRACT

The present disclosure relates to the communications field, and disclose a wireless connection switching method and a terminal. A specific solution is as follows: A first terminal establishes a first wireless connection to a second terminal. When the first terminal needs to establish a second wireless connection to the second terminal, the first terminal negotiates, with the second terminal by using the first wireless connection, information required for establishing the second wireless connection. Subsequently, the first terminal can establish the second wireless connection to the second terminal based on the negotiated information required for establishing the second wireless connection.

17 Claims, 12 Drawing Sheets

(51) Int. Cl.
    *H04W 8/00*      (2009.01)
    *H04W 88/06*     (2009.01)

(56) References Cited

U.S. PATENT DOCUMENTS

| | | |
|---|---|---|
| 2013/0137368 A1 | 5/2013 | Jiang et al. |
| 2014/0206346 A1* | 7/2014 | Kiukkonen ............ H04W 4/80 |
| | | 455/426.1 |
| 2014/0308954 A1 | 10/2014 | Wang et al. |
| 2014/0323048 A1 | 10/2014 | Kang |
| 2016/0234870 A1 | 8/2016 | Borges et al. |
| 2016/0374139 A1 | 12/2016 | Chen et al. |
| 2017/0223579 A1 | 8/2017 | Lee et al. |
| 2017/0311248 A1 | 10/2017 | Sato |
| 2018/0077738 A1* | 3/2018 | Kim ...................... H04W 76/14 |
| 2018/0220353 A1* | 8/2018 | Mendiola ............. H04W 88/04 |
| 2019/0273630 A1 | 9/2019 | Matsuo |

FOREIGN PATENT DOCUMENTS

| | | |
|---|---|---|
| CN | 103179638 A | 6/2013 |
| CN | 103379570 A | 10/2013 |
| CN | 103748907 A | 4/2014 |
| CN | 103856527 A | 6/2014 |
| CN | 104185299 A | 12/2014 |
| CN | 104254144 A | 12/2014 |
| CN | 105144757 A | 12/2015 |
| CN | 105557021 A | 5/2016 |
| EP | 2597924 A1 | 5/2013 |
| WO | 2014087229 A2 | 6/2014 |
| WO | 2014175149 A1 | 10/2014 |
| WO | 2016017908 A1 | 2/2016 |

* cited by examiner

WIRELESS CONNECTION SWITCHING METHOD AND TERMINAL

CROSS-REFERENCE TO RELATED APPLICATIONS

This application is a National Stage of International Application No. PCT/CN2017/074769, filed on Feb. 24, 2017, which claims priority to Chinese Patent Application No. 201611210218.5, filed on Dec. 24, 2016. Both of the aforementioned applications are hereby incorporated by reference in their entireties.

TECHNICAL FIELD

Embodiments of this application relate to the communications field, and in particular, to a wireless connection switching method and a terminal.

BACKGROUND

Currently, wireless communications modes supported by a terminal include a Wireless Fidelity (Wireless Fidelity, Wi-Fi) station mode, a Wi-Fi peer-to-peer (Peer-to-Peer, P2P) mode, a Wi-Fi wireless access point (Wireless Access Point) mode, a Bluetooth (Bluetooth) (also referred to as Bluetooth Basic Rate (Basic Rate, BR) or Bluetooth Enhanced Data Rate (Enhanced Data Rate, EDR)) mode, a Bluetooth low energy (Bluetooth Low Energy, BLE) mode, a near field communication (Near Field Communication, NFC) mode, and the like. A terminal user may select, based on different transmission requirements, one of the near field communication modes to communicate with a peer end.

Currently, two terminals need to perform device discovery in a manner in which one party performs broadcasting and the other party performs scanning. Only in this way, one of the two terminals can identify the other terminal and establish a wireless connection to the other terminal for near field communication. In this process, the two terminals negotiate information required for establishing the wireless connection. For example, a terminal A broadcasts device information, capability information, and the like of the terminal A. A terminal B performs scanning for a terminal that is in a broadcasting state (namely, a connectable state), and obtains, through scanning, the device information, the capability information, and the like that are broadcast by the terminal A. After identifying the terminal A based on the information, the terminal B can establish a wireless connection to the terminal A based on the information.

If a wireless connection has been established between a terminal and a peer end, when the wireless connection is to be switched to another manner of wireless connection, the terminal still needs to repeatedly perform a complex device discovery process with the peer end, to identify the peer end and obtain information broadcast by the peer end. Only in this way, the terminal can establish a new wireless connection to the peer end, and communicate with the peer end by using the new wireless connection. Consequently, the terminal and the peer end cannot fast switch to an expected wireless connection, thereby affecting communication between the terminal and the peer end.

SUMMARY

Embodiments of this application provide a wireless connection switching method and a terminal. Information required for establishing a new wireless connection is negotiated by using an existing wireless connection. In this way, the terminal can fast establish the new wireless connection to a peer end based on the information negotiated by using the existing wireless connection, without performing a complex device discovery process to obtain information broadcast by the peer end, so that the wireless connection between the terminals is fast switched, and impact of wireless connection switching on communication between the terminal and the peer end can be avoided to some extent.

To achieve the foregoing objective, the embodiments of this application use the following technical solutions.

A first aspect of the embodiments of this application provides a wireless connection switching method, including: First, a first terminal establishes a first wireless connection to a second terminal. When the first terminal needs to establish a second wireless connection to the second terminal, the first terminal negotiates, with the second terminal by using the first wireless connection, information required for establishing the second wireless connection. Subsequently, the first terminal can establish the second wireless connection to the second terminal based on the negotiated information required for establishing the second wireless connection.

In the method provided in this embodiment of this application, when a wireless connection has been established between two terminals, and another wireless connection is to be established between the two terminals, the terminals reuse the established wireless connection as a control channel to fast negotiate information required for establishing the new wireless connection, without repeatedly performing a complex device discovery process to obtain the information required for establishing the new wireless connection, so that the terminals can establish the new wireless connection to each other based on the obtained information. It can be learned that in the method provided in this embodiment of this application, the wireless connection between the terminals can be fast switched, and impact of wireless connection switching on communication between the terminals can be avoided to some extent.

With reference to the first aspect, in a first possible implementation of the first aspect, before the first terminal negotiates, with the second terminal by using the established first wireless connection, the information required for establishing the second wireless connection, the first terminal may further obtain capability information of the second terminal, and determine, based on the capability information of the second terminal, that the second terminal supports the to-be-established second wireless connection.

In some embodiments of this application, before establishing a wireless connection to a peer end, a terminal may first acknowledge that the peer end also supports the wireless connection, and then negotiate, with the peer end, information required for establishing the new wireless connection. When the peer end does not support the wireless connection, the terminal no longer sends, to the peer end, the information required for establishing the new wireless connection, to reduce signaling overheads of the terminal.

With reference to the first possible implementation of the first aspect, in a second possible implementation of the first aspect, before the first terminal obtains the capability information of the second terminal, the first terminal may further determine a type of the second wireless connection based on a user indication or an attribute of to-be-transmitted data, where the attribute of the to-be-transmitted data includes a data type of the to-be-transmitted data and a byte size of the to-be-transmitted data.

During specific implementation, the first terminal may obtain an instruction triggered by a user by using the first terminal, where the instruction indicates the type of the second wireless terminal selected by the user, and the first terminal may determine the type of the second wireless connection based on the instruction. Alternatively, the first terminal determines the type of the second wireless connection based on the type of the to-be-transmitted data. Specifically, an application program that needs to transmit data may initiate a specific type of channel establishment request based on the type of the to-be-transmitted data, and the first terminal may determine the type of the second wireless connection based on the type of the channel establishment request.

With reference to the first aspect, or the first or the second possible implementation of the first aspect, in a third possible implementation of the first aspect, if the second wireless connection is Bluetooth, for example, BR or BLE, that the first terminal negotiates, with the second terminal by using the first wireless connection, information required for establishing the second wireless connection specifically includes: sending, by the first terminal, a first MAC address to the second terminal by using the first wireless connection, and receiving, by using the first wireless connection, a second MAC address sent by the second terminal, where the first MAC address is a MAC address of the first terminal, and the second MAC address is a MAC address of the second terminal, so that the information that is required for establishing the second wireless connection and that is negotiated by the first terminal with the second terminal includes the first MAC address and the second MAC address, and then the first terminal establishes the second wireless connection to the second terminal based on the first MAC address and the second MAC address.

In the prior art, when the first terminal needs to establish a Bluetooth connection to the second terminal, the first terminal needs to perform device discovery to obtain the MAC address of the second terminal, and send the MAC address of the first terminal to the second terminal. In this embodiment of this application, when the newly established second connection is Bluetooth or BLE, without performing a complex device discovery process again, the first terminal obtains, by using the existing wireless connection, the information (including the MAC address of the second terminal) that is required for establishing the new wireless connection and that originally should be obtained in the device discovery process, so that the first terminal can fast establish the Bluetooth connection or the BLE connection to the second terminal based on the obtained information.

With reference to the first aspect, or the first or the second possible implementation of the first aspect, in a fourth possible implementation of the first aspect, if the second wireless connection is a wireless local area network (Wireless Local Area Network, WLAN) connection, for example, a Wi-Fi P2P connection or a Wi-Fi AP connection, that the first terminal negotiates, with the second terminal by using the first wireless connection, information required for establishing the second wireless connection specifically includes: sending, by the first terminal, a first information set to the second terminal by using the first wireless connection, where the first information set includes a wireless local area network identifier provided by the first terminal, a wireless local area network password provided by the first terminal, and a wireless local area network frequency provided by the first terminal, so that the second terminal receives the first information set, and accesses, based on the first information set, a wireless local area network provided by the first terminal. In addition, the first terminal receives a second MAC address sent by the second terminal, where the second MAC address is a MAC address of the second terminal, so that the information required for establishing the second wireless connection includes the first information set and the second MAC address, and then the first terminal can establish the second wireless connection to the second terminal after acknowledging, based on the second MAC address, that the second terminal accesses the wireless local area network provided by the first terminal.

In the prior art, when the first terminal needs to establish the Wi-Fi P2P connection or the Wi-Fi AP connection to the second terminal, the first terminal needs to perform device discovery to determine "GO" and "GC" in the first terminal and the second terminal. In this process, "GO" needs to send a wireless local area network identifier, a wireless local area network password, and other information to "GC", and "GC" needs to send a MAC address of "GC" to "GO". In this embodiment of this application, when the newly established second connection is the Wi-Fi P2P connection or the Wi-Fi AP connection, without performing a complex device discovery process again, the first terminal obtains, by using the existing wireless connection, the information (including the first information set and the second MAC address) that is required for establishing the new wireless connection and that originally should be obtained in the device discovery process, so that the first terminal can fast establish the Wi-Fi P2P connection or the Wi-Fi AP connection to the second terminal based on the obtained information.

With reference to the first aspect, or the first or the second possible implementation of the first aspect, in a fifth possible implementation of the first aspect, if the second wireless connection is a WLAN connection, for example, the first terminal communicates with the second terminal in a Wi-Fi station mode, that the first terminal negotiates, with the second terminal by using the first wireless connection, information required for establishing the second wireless connection specifically includes: if acknowledging, based on the first wireless connection, that the first terminal and the second terminal are in a same network segment, sending, by the first terminal, a first IP address to the second terminal by using the first wireless connection, and receiving, by using the first wireless connection, a second IP address sent by the second terminal, where the first IP address is an IP address of the first terminal, and the second IP address is an IP address of the second terminal, so that the information required for establishing the second wireless connection includes the first IP address and the second IP address, and then the first terminal establishes the second wireless connection to the second terminal based on the first IP address and the second IP address.

In the prior art, when the first terminal needs to perform wireless communication with the second terminal in the Wi-Fi station mode, the first terminal needs to perform device discovery to obtain the IP address of the second terminal. In this embodiment of this application, when the first terminal needs to perform wireless communication with the second terminal in the Wi-Fi station mode, without performing a complex device discovery process again, the first terminal obtains, by using the existing wireless connection, the information (the IP address of the second terminal) that is required for establishing the new wireless connection and that originally should be obtained in the device discovery process, so that the first terminal can fast perform wireless communication with the second terminal in the Wi-Fi station mode based on the obtained information.

With reference to any one of the first aspect, or the first to the fifth possible implementations of the first aspect, in a sixth possible implementation of the first aspect, after the first terminal establishes the second wireless connection to the second terminal based on the information required for establishing the second wireless connection, the method further includes: giving a prompt that the second wireless connection to the second terminal is established, so that a user knows a wireless connection establishment status of the terminal.

In some embodiments, when the first terminal no longer transmits data by using the first wireless connection, the first terminal may release the first wireless connection.

According to a second aspect, a terminal is disclosed, where the terminal is a first terminal, and the first terminal includes:

an establishment unit, configured to establish a first wireless connection to a second terminal; and a negotiation unit, configured to negotiate, with the second terminal by using the first wireless connection established by the establishment unit, information required for establishing a second wireless connection, where the establishment unit is further configured to establish the second wireless connection to the second terminal based on the information that is required for establishing the second wireless connection and that is negotiated by the negotiation unit.

With reference to the second aspect, in a first possible implementation of the second aspect, the first terminal further includes an obtaining unit and a determining unit, where the obtaining unit is specifically configured to obtain capability information of the second terminal; and the determining unit is configured to determine, based on the capability information, that the second terminal supports the second wireless connection.

With reference to the first possible implementation of the second aspect, in a second possible implementation of the second aspect, the determining unit is further configured to: before the obtaining unit obtains the capability information of the second terminal, determine a type of the second wireless connection based on a user indication or an attribute of to-be-transmitted data, where the attribute of the to-be-transmitted data includes a data type of the to-be-transmitted data and a byte size of the to-be-transmitted data.

With reference to the second aspect, or the first or the second possible implementation of the second aspect, in a third possible implementation of the second aspect, if the second wireless connection is a Bluetooth connection, the negotiation unit is specifically configured to: send a first MAC address to the second terminal by using the first wireless connection, and receive, by using the first wireless connection, a second MAC address sent by the second terminal, where the first MAC address is a MAC address of the first terminal, and the second MAC address is a MAC address of the second terminal; and the establishment unit is specifically configured to establish the second wireless connection to the second terminal based on the first MAC address and the second MAC address.

With reference to the second aspect, or the first or the second possible implementation of the second aspect, in a fourth possible implementation of the second aspect, if the second wireless connection is a WLAN connection, for example, a Wi-Fi P2P connection or a Wi-Fi AP connection, the negotiation unit is specifically configured to send a first information set to the second terminal by using the first wireless connection, where the first information set includes a wireless local area network identifier provided by the first terminal, a wireless local area network password provided by the first terminal, and a wireless local area network frequency provided by the first terminal, so that the second terminal receives the first information set, and accesses, based on the first information set, a wireless local area network provided by the first terminal; and the negotiation unit is further configured to receive, by using the first wireless connection, a second MAC address sent by the second terminal, where the second MAC address is a MAC address of the second terminal; and the establishment unit is specifically configured to establish the second wireless connection to the second terminal after acknowledging, based on the second MAC address, that the second terminal accesses the wireless local area network provided by the first terminal.

With reference to the second aspect, or the first or the second possible implementation of the second aspect, in a fifth possible implementation of the second aspect, if the second wireless connection is a WLAN connection, for example, the first terminal communicates with the second terminal in a Wi-Fi station mode, the negotiation unit is specifically configured to: if acknowledging, based on the first wireless connection, that the first terminal and the second terminal are in a same network segment, send a first IP address to the second terminal by using the first wireless connection, and receive, by using the first wireless connection, a second IP address sent by the second terminal, where the first IP address is an IP address of the first terminal, and the second IP address is an IP address of the second terminal; and the establishment unit is specifically configured to establish the second wireless connection to the second terminal based on the first IP address and the second IP address.

With reference to any one of the second aspect, or the first to the fifth possible implementations of the second aspect, in a sixth possible implementation of the second aspect, the terminal further includes a prompt unit. The prompt unit is configured to give a prompt that the second wireless connection to the second terminal is established.

A third aspect of the embodiments of this application provides a terminal, where the terminal may include a processor, a memory, and a wireless module.

The memory is configured to store a computer execution instruction, and when the terminal runs, the processor executes the computer execution instruction stored in the memory, so that a server performs the wireless connection switching method according to any one of the first aspect or possible implementations of the first aspect, for example, establishes a first wireless connection or a second wireless connection to a second terminal.

DESCRIPTION OF EMBODIMENTS

Figure 1:
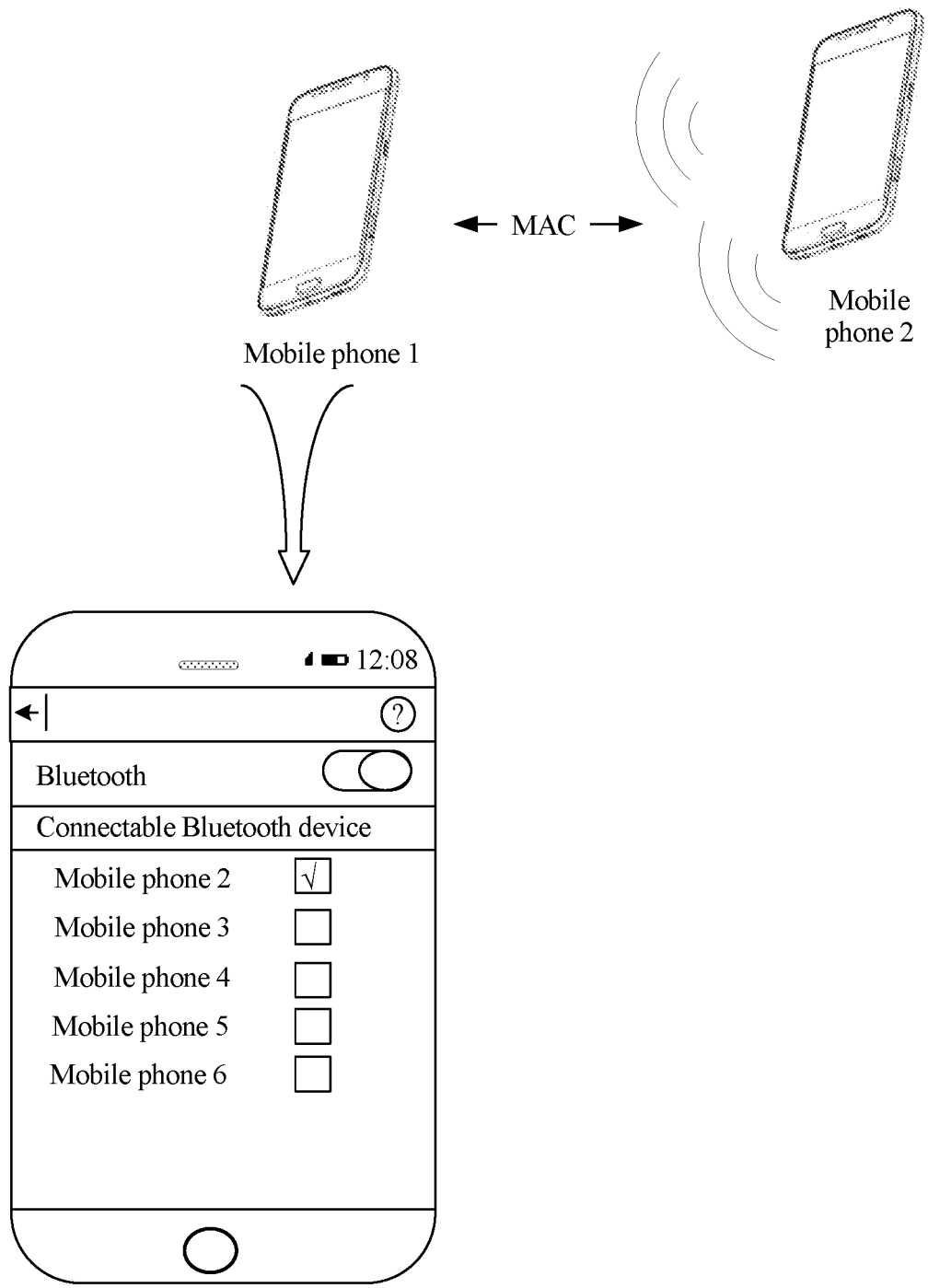
FIG. 1 is a schematic diagram of establishing a Bluetooth connection between mobile phones according to the prior art.

Before establishing a wireless connection to a peer end, a terminal first needs to perform device discovery in a manner in which one party performs broadcasting and the other party performs scanning. In this process, the terminal negotiates, with the peer end, information required for establishing the wireless connection. For example, as shown in FIG. 1, a mobile phone 1 needs to establish a Bluetooth connection to a mobile phone 2. A user first needs to set the mobile phone 1 and the mobile phone 2 to a Bluetooth visible state. To be specific, the mobile phone 2 broadcasts a MAC (Media Access Control, Media Access Control) address of the mobile phone 2, and the mobile phone 1 obtains, through scanning, the MAC address broadcast by the mobile phone 2, and sends a MAC address of the mobile phone 1 to the mobile phone 2. In this way, the mobile phone 1 completes the device discovery process with the mobile phone 2. Subsequently, the mobile phone 1 can establish the Bluetooth connection to the mobile phone 2 based on the MAC address of the mobile phone 1 and the MAC address of the mobile phone 2, to perform Bluetooth communication.

Even if the Bluetooth connection has been established between the mobile phone 1 and the mobile phone 2, when the mobile phone 1 is to establish a BLE connection to the mobile phone 2, the mobile phone 1 still needs to perform a complex device discovery process. Only in this way, the mobile phone 1 can obtain the MAC address of the mobile phone 2, to establish the BLE connection based on the MAC address of the mobile phone 1 and the MAC address of the mobile phone 2.

It can be learned that even if a wireless connection has been established between two terminals, when another mode of wireless connection needs to be established between the two terminals, a terminal still needs to perform a complex device discovery process to obtain information broadcast by a peer end. Only in this way, the terminal can establish a new wireless connection based on the obtained information. Consequently, the two terminals cannot fast switch to an expected wireless connection, thereby affecting communication between the terminals.

The following describes in detail how a terminal performs device discovery and how to establish a wireless connection based on information obtained in the device discovery process in several wireless connection modes currently supported by the terminal.

1. Bluetooth: Bluetooth is a wireless technology standard, and can implement a short-distance data exchange between immobile terminals or mobile terminals.

A Bluetooth connection establishment process includes device discovery and connection. The device discovery process mainly includes: A terminal A is in a visible state, and broadcasts a MAC address, a clock, a device type, a device name, and other information of the terminal A. A terminal B first performs scanning for a terminal that is in a visible state, and then, selects the terminal A from connectable devices obtained through scanning, and sends a MAC address, a clock, a device type, a device name, and other information of the terminal B to the terminal. It can be learned that in a Bluetooth device discovery process, a terminal obtains a MAC address, a clock, a device type, a device name, and other information of a peer end.

Subsequently, the connection process is entered: The terminal B sends a paging request based on a paging scanning frequency hopping sequence, and the terminal A listens to the paging request of the terminal B at a fixed period. The paging scanning frequency hopping sequence is computed based on the MAC address of the terminal A. The terminal A immediately sends a first paging response after listening to and obtaining the paging request of the terminal B. The terminal B sends a second paging response after receiving the first paging response, and the second paging response includes frequency hopping sequence information and a clock phase that are computed based on the MAC address of the terminal B. After receiving the second terminal paging response, the terminal A returns the first terminal paging response again. After the terminal B receives the response, the terminal B and the terminal A enter a connection state.

2. BLE: Similar to a classic Bluetooth technology, BLE is a short-distance wireless communications technology with extremely low power consumption. Different from the classic Bluetooth technology, in BLE, two communications terminals are connected to each other at specific time.

Likewise, a BLE connection establishment process includes device discovery and connection. The discovery process of the two communications terminals includes: A terminal A in a connectable state broadcasts a packet at a specific period, and the packet carries a MAC address of the terminal A. A terminal B performs scanning based on a scanning window and a scanning interval. After the terminal B obtains, through scanning, the packet broadcast by the terminal A, the discovery process of the two communications terminals is completed. Likewise, in a Bluetooth device discovery process, a terminal obtains a MAC address, a clock, a device type, a device name, and other information of a peer end.

Subsequently, the connection process is entered: After obtaining, through scanning, the packet broadcast by the terminal A, the terminal B returns a response message. The message carries a communication time sequence parameter and a MAC address of the terminal B, and the parameter is used to indicate a time sequence in which the terminal A and terminal B subsequently communicate with each other, for example, a time point at which the two parties receive/send data, or a physical channel on which the two parties receive/send data. After sending the response message, the terminal B automatically changes to a connection state. Likewise, after receiving the response message, the terminal A also automatically changes to a connection state. Afterward, the two parties switch to a specific physical channel at specific time based on the communication time sequence parameter and the MAC addresses of the two parties, to receive/send data, until the connection is disconnected.

3. Wi-Fi Station:

When two terminals are connected to a same router (in other words, are in a same wireless local area network), the two terminals may communicate with each other through forwarding of the router. During actual application, a device discovery process of the terminals includes: A user inputs an IP address of a destination terminal to a source terminal, and then the source terminal attempts to perform wireless communication with the destination terminal based on the IP address of the destination terminal. Alternatively, the process includes: An IP address of a destination terminal is coded into quick response code for scanning by the source terminal. Alternatively, a source terminal may automatically discover an IP address of a destination terminal according to a wireless local area network autodiscovery protocol. Specifically, the destination terminal performs network broadcasting in a wireless local area network in which the two terminals are located (namely, a wireless local area network in which the source terminal and the destination terminal are located), to broadcast the IP address of the destination terminal, and the source terminal may obtain the IP address of the destination terminal through scanning.

In a Wi-Fi station mode, a terminal obtains an IP address of a peer end in a device discovery process, and performs wireless communication with the peer end in the Wi-Fi station mode based on the obtained IP address.

4. Wi-Fi P2P:

Wi-Fi P2P may also be referred to as Wi-Fi Direct. Generally, if two terminals both support a P2P function, a P2P channel may be directly established between the two terminals within an effective Wi-Fi range of the terminals. The two terminals may send a message to each other by using the P2P channel. It should be noted that the P2P mode is not limited to a network segment in which the terminals are located. When the two terminals are not in a same network segment, but a P2P channel exists between the two terminals, the two terminals may also communicate with each other by using the P2P channel.

Similarly, in a P2P channel establishment process, two P2P terminals that communicate with each other first perform a device discovery process. In this process, a GO (Group Owner) and a GC (Group Client) are determined in the two P2P terminals. The GO is equivalent to a conventional AP, and is "network providing party". The GC is "network access party". In this process, a P2P terminal acting as the GC obtains a wireless local area network SSID, a wireless local area network password, and other information that are sent by a P2P terminal acting as the GO, and the P2P terminal acting as the GO obtains a MAC address sent by the P2P terminal acting as the GC. Subsequently, the P2P terminal acting as the GC accesses, based on the received wireless local area network SSID, wireless local area network password, and other information, a network provided by the P2P terminal acting as the GO (that is, a network provided by a router to which the P2P terminal acting as the GO is connected), and the P2P terminal acting as the GO may identify, based on the received MAC address, the P2P terminal acting as the GC.

5. Wi-Fi AP Hotspot:

Within an effective Wi-Fi range of terminals, an AP hotspot connection may be established between any two terminals, and one party shares a network (a GPRS, 3G or 4G network) with the other party for data transmission between the two terminals. A discovery process of the two terminals that communicate with each other includes: A terminal 1 enables an AP hotspot, and a terminal 2 enters a Wi-Fi scanning interface, and discovers the terminal 1 through scanning. In this process, the terminal 2 may obtain information about the hotspot provided by the terminal 1. Subsequently, the terminal 2 receives a hotspot password entered by a user, and is connected to the hotspot provided by the terminal 1.

6. NFC:

NFC is a short-distance connection protocol in which data is transmitted in an electromagnetic induction coupling manner, features in a short distance, high bandwidth, low power consumption, and the like, and is applied to fields such as door control, bus, mobile phone payment.

A device that enables NFC communication is also referred to as an NFC master device, and provides a radio frequency field (RF field) in an entire communication process. The device can select one transmission rate from 106 kbps, 212 kbps, and 421 kbps, to send data to another device (referred to as an NFC target device). The NFC target device can return data to the NFC master device at the same rate only by using a load modulation (load modulation) technology, without generating a radio frequency field.

In the foregoing several wireless connections, BLE is a wireless connection mode with shortest connection establishment time and lowest power consumption, and P2P is a wireless connection mode with a highest transmission rate. Therefore, with reference to the method provided in the embodiments of this application, a terminal can fast switch, based on different to-be-transmitted data, to a wireless connection manner to which the data is applicable, to achieve a best data transmission effect. For example, Bluetooth or BLE that has relatively low power consumption and that is relatively conveniently connected may be first used when a connection is established between two terminals, and then the connection is switched to a connection in a Wi-Fi mode with a relatively high rate and relatively high power consumption when a large file needs to be transmitted. Further, if the two terminals are in a same Wi-Fi network segment (in other words, are connected to a same router), the two terminals may switch to the Wi-Fi station mode. If the two terminals support the Wi-Fi P2P mode, the two terminals may switch to the Wi-Fi P2P mode; or if the two terminals do not support the Wi-Fi P2P mode, the two terminals may switch to the Wi-Fi hotspot mode.

The embodiments of this application provide a wireless connection switching method, and a basic principle of the method is as follows: When a wireless connection has been established between two terminals, and another wireless connection is to be established between the two terminals, the established wireless connection is reused as a control channel to fast negotiate information required for establishing the new wireless connection. In this way, the terminal can fast obtain, by using the existing wireless connection, the information that originally should be obtained in a device discovery process, without performing the complex device discovery process repeatedly. Then, the terminal can fast establish the new wireless connection to a peer end based on the information obtained by using the existing wireless connection. It can be learned that in the method provided in the embodiments of this application, the wireless connection between the terminals can be fast switched, and impact of wireless connection switching on communication between the terminals can be avoided to some extent.

The following describes implementations of the embodiments of this application in detail with reference to the accompanying drawings.

Figure 2:
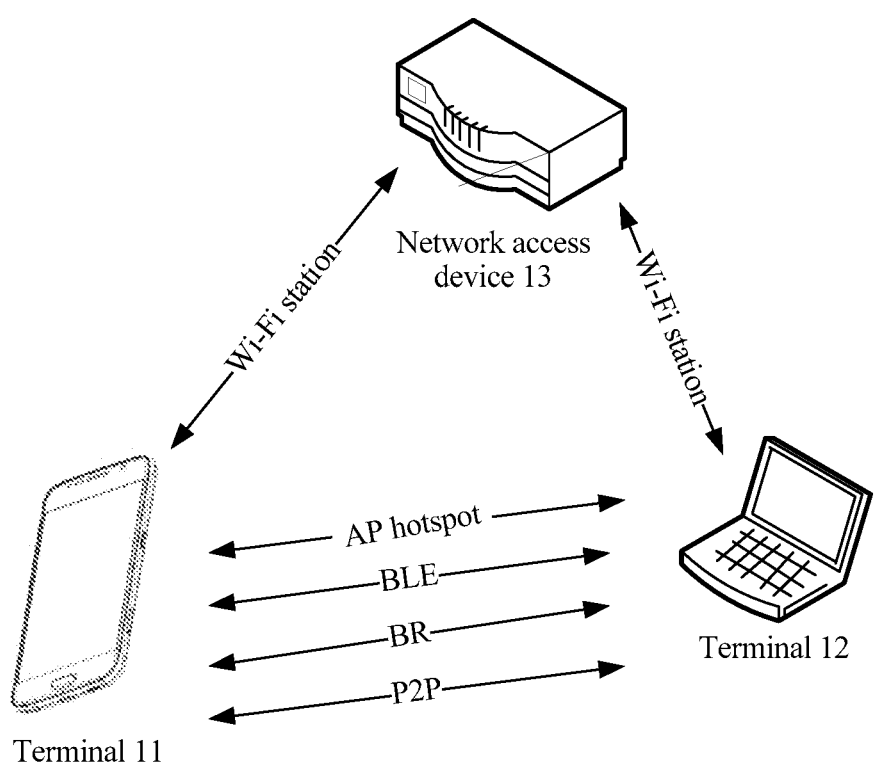
FIG. 2 is a simplified schematic diagram of a system architecture according to an embodiment of this application.

FIG. 2 is a simplified schematic diagram of a system architecture applicable to an embodiment of this application. As shown in FIG. 2, the system architecture may include a terminal 11, a terminal 12, and a network access device 13. Both the terminal 11 and the terminal 12 access the network access device 13.

The terminal 11 and the terminal 12 may be mobile phones, personal digital assistants (personal digital assistant, PDA), personal computers (personal computer, PC), or the like. The network access device 13 may be a router. During specific implementation, the terminal 11 and the terminal 12 may communicate with each other in a Wi-Fi station mode, to be specific, perform high-rate data transmission with each other through forwarding of the network access device 13. In addition, a Bluetooth connection, a BLE connection, a Wi-Fi P2P connection, or a Wi-Fi AP hotspot connection may also be established between the terminal 11 and the terminal 12. The method provided in the embodiments of this application is applicable to switching of a wireless connection between the terminal 11 and the terminal 12.

Figure 3:
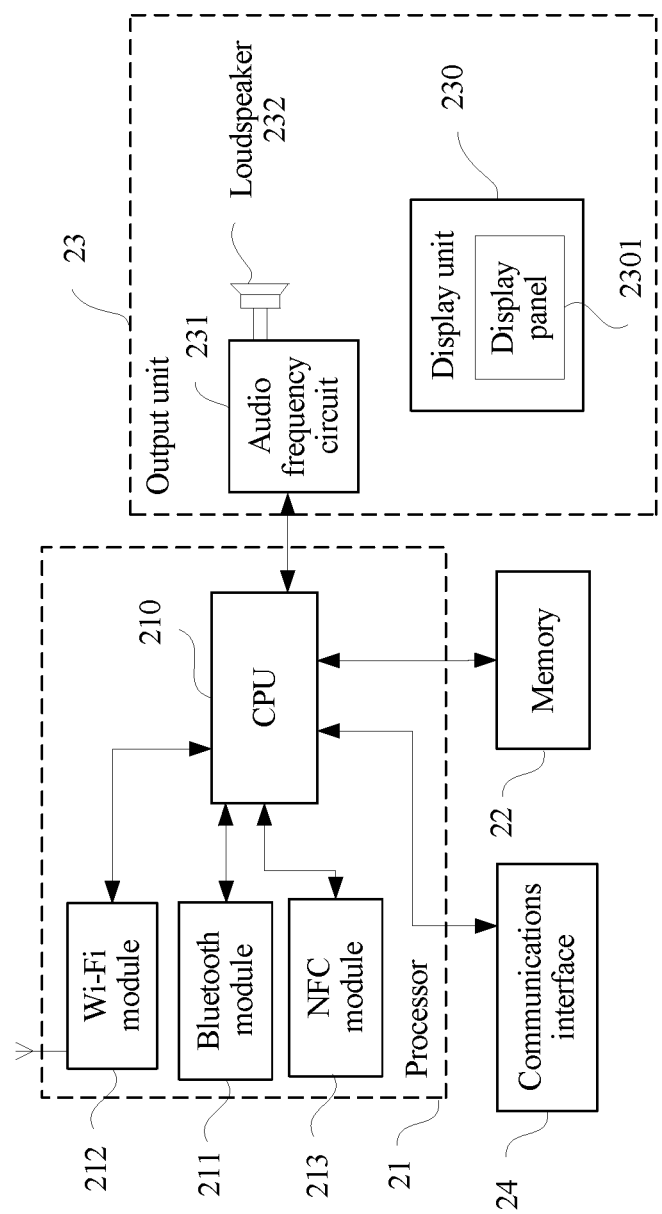
FIG. 3 is a schematic composition diagram of a terminal according to an embodiment of this application.

FIG. 3 is a schematic composition diagram of a terminal according to an embodiment of this application. The terminal is a first terminal, and the first terminal may be the terminal 11 or the terminal 12 in FIG. 2. As shown in FIG. 3, the first terminal may include at least one processor 21, a memory 22, an output module 23, and a communications interface 24. The processor 21 may include a central processing unit (central processing unit, CPU) 210, a Bluetooth module 211, a Wi-Fi module 212, and an NFC module 213.

The following describes the components of the terminal in detail with reference to FIG. 3.

The CPU included in the processor 21 may be an application-specific integrated circuit (Application-Specific Integrated Circuit, ASIC), or is configured as one or more integrated circuits for implementing the embodiments of this application, for example, one or more microprocessors (digital signal processor, DSP), or one or more field programmable gate arrays (Field Programmable Gate Array, FPGA).

The processor 21 may implement various functions of the terminal by running or executing a software program stored in the memory 22 and invoking data stored in the memory 22.

During specific implementation, in an embodiment, the terminal may include a plurality of processors. Each of these processors may be a single-core processor (single-CPU), or may be a multi-core processor (multi-CPU). The processor herein may be one or more terminals, circuits, and/or processing cores configured to process data (for example, a computer program instruction).

The memory 22 may be a read-only memory (read-only memory, ROM) or another type of static storage terminal capable of storing static information and instructions, or a random access memory (random access memory, RAM) or another type of dynamic storage terminal capable of storing information and instructions; or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compressed optical disc, a laser disc, an optical disc, a digital universal optical disc, a Blu-ray optical disc, and the like), a magnetic disk storage medium or another magnetic storage terminal, or any other medium capable of carrying or storing expected program code in a form of an instruction or a data structure and capable of being accessed by a computer. However, the memory 22 is not limited thereto. The memory 22 may exist independently, and is connected to the processor 21 by using a communications bus 21. Alternatively, the memory 22 may be integrated with the processor 21.

The memory 22 is further configured to store a software program for executing the solutions of this application, and the processor 21 controls execution of the software program.

The output module 23 may be a display unit 230 of the first terminal, and may be configured to display information that is input by a user or information provided for a user, and various menus of the first terminal. The display unit 230 may include a display panel 2301. Optionally, the display panel 2301 may be configured in a form of an LCD (Liquid Crystal Display, liquid crystal display), an OLED (Organic Light-Emitting Diode, organic light-emitting diode), or the like. Further, a touchscreen 2302 may cover the display panel 2301. In FIG. 3, the touchscreen 2302 and the display panel 2301 are used as two independent components to implement input and input functions of the first terminal. However, in some embodiments, the touchscreen 2302 and the display panel 2301 may be integrated to implement the input and output functions of the first terminal.

Alternatively, the output module 23 may be an audio frequency circuit 231 or a loudspeaker 232 of the first terminal. The audio frequency circuit 231 may transmit, to the loudspeaker 232, a received electrical signal converted from audio data, and the loudspeaker 232 converts the electrical signal into a sound signal for outputting.

The communications interface 24 may be any apparatus like a transceiver, and is configured to communicate with another device or communications network, such as an Ethernet, a radio access network (radio access network, RAN), or a wireless local area network (Wireless Local Area Network, WLAN). The communications interface 24 may include a receiving unit for implementing a receiving function and a sending unit for implementing a sending function.

The Bluetooth module 211 is integrated with a Bluetooth chip, is applicable to a classic Bluetooth protocol and a Bluetooth low energy protocol, and is configured to support the first terminal in establishing a Bluetooth connection or a BLE connection to another device.

The Wi-Fi module 212 is integrated with a Wi-Fi chip, and is configured to: support the first terminal in communicating with another device in a Wi-Fi station mode, and support the first terminal in establishing a Wi-Fi AP connection or a Wi-Fi P2P connection to another device.

The NFC module 213 is integrated with an NFC chip, and is configured to support the first terminal in establishing an NFC connection to another device.

The terminal structure shown in FIG. 3 constitutes no limitation on the terminal, and may include more or fewer components than those shown in the figure, or combine some components, or have different component arrangements.

In an embodiment of this application, the processor 21 invokes code in the memory 22 to perform the following method: The processor 21 first obtains a wireless connection capability set of the first terminal, where the wireless connection capability set includes a wireless connection mode supported by the first terminal. Subsequently, when the first terminal needs to perform data transmission with a second terminal by using an application program, the application program initiates a channel establishment request to the processor 21 based on a type of to-be-transmitted data. A type of the channel establishment request may be one of the following types: a file transmission (Resource) type, a message push (InstantMessage) type, a one-time signaling interaction (Token) type, a streaming media (Stream) type, and the like. The processor 21 selects a suitable first wireless connection from the wireless connection capability set based on the type of the channel establishment request. It should be noted that a BLE connection may be preferentially established.

The processor 21 invokes a module corresponding to the first wireless connection to perform device discovery with the second terminal. The processor 21 obtains capability information, information required for establishing the first wireless connection, and the like that are broadcast by the second terminal, and determines, based on the capability information, that the second terminal supports the first wireless connection. Subsequently, the processor establishes the first wireless connection to the second terminal based on the information broadcast by the second terminal.

In addition, the processor 21 registers an established channel in the memory 22, and records a reference count of each channel. The reference count is a quantity of application programs that use the channel. For example, a Bluetooth channel 1 established between a terminal 11 and a terminal 12 is registered, and a reference count of the Bluetooth channel 1 is 1.

The processor 21 receives a channel establishment request from the application program, where the channel establishment request is used to request to perform data transmission with the peer end. The processor 21 determines a to-be-established second wireless connection from the wireless connection capability set based on a type of the channel establishment request. For example, if the channel establishment request is of the resource type, high-rate data transmission may be performed through forwarding of a network access device 13. If the channel establishment request is of the InstantMessage type or the token type, a BLE connection with shortest connection establishment time may be established.

The processor 21 queries the memory 22 to determine that the first terminal has established the first wireless connection to the peer end, and then negotiates, with the peer end by using the first connection, information required for establishing the second wireless connection. Certainly, in this process, the processor 21 obtains the capability information of the second terminal, and determines that the second terminal supports the second wireless connection. Subsequently, the processor 21 invokes, based on the negotiated information, a module corresponding to the second wireless connection to establish the second wireless connection. For example, the processor 21 invokes the Bluetooth module 211 to establish a Bluetooth connection to the peer end.

A detailed process in which the processor 21 negotiates, with the peer end, the information required for establishing the second wireless connection is described below by using an example in which a terminal 11 performs data transmission with a terminal 12 through forwarding of a network access device 13 in the Wi-Fi station mode. The process includes: If acknowledging, by using the first wireless connection, that the first terminal and the second terminal are in a same network segment (in other words, are connected to a same router), the processor 21 sends, to the second terminal, a network segment in which the first terminal is located. If acknowledging that the network segment in which the first terminal is located is the same as a network segment in which the second terminal is located, the second terminal returns an acknowledgement message, for example, "yes". After receiving the acknowledgement message by using the first wireless connection, the first terminal sends an IP address of the first terminal to the second terminal by using the first wireless connection, and receives, by using the first wireless connection, an IP address of the second terminal that is returned by the second terminal. Subsequently, the first terminal and the second terminal may perform high-rate data transmission with each other based on the respective IP addresses through forwarding of the network access device 13.

It can be learned that in the method provided in this embodiment of this application, if a wireless connection has been established between two terminals, when a wireless connection mode between the terminals is to be changed, a terminal that initiates a wireless connection can fast negotiate, with a peer end by using the existing wireless connection, information required for establishing the new wireless connection, without performing a complex and slow discovery process (namely, a process of searching, selection, and authentication) to obtain the information required for establishing the new wireless connection, and then fast establish the new wireless connection based on the negotiated information. Therefore, impact of wireless connection switching on communication between the terminal and the peer end can be avoided to some extent.

Figure 4:
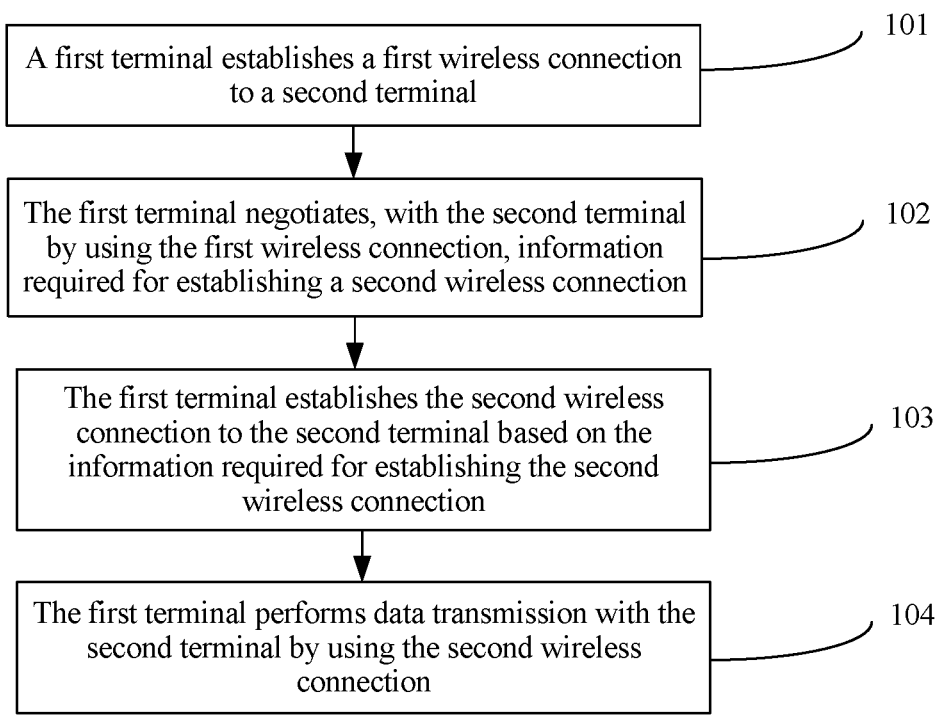
FIG. 4 is a flowchart of a wireless connection switching method according to an embodiment of this application.

FIG. 4 is a flowchart of a wireless connection switching method according to an embodiment of this application. As shown in FIG. 4, the method may include the following steps.

101. A first terminal establishes a first wireless connection to a second terminal.

The first wireless connection is determined based on a type of data to be transmitted between the first terminal and the second terminal, and may be a Bluetooth connection, a Wi-Fi P2P connection, a Wi-Fi AP hotspot connection, an NFC connection, or the like. This is not limited herein. In some implementations, when the first terminal is connected to the second terminal, the first terminal may first use a BLE connection or a BR connection that has relatively low power consumption and that is relatively conveniently connected. To be specific, the first wireless connection initially established by the first terminal to the second terminal may be the BLE connection or the BR connection.

During specific implementation, the first terminal invokes a module corresponding to the first wireless connection to perform device discovery with the second terminal, obtains capability information, information required for establishing the first wireless connection, and the like that are broadcast by the second terminal, and determines, based on the capability information, that the second terminal supports the first wireless connection. Subsequently, the first terminal establishes the first wireless connection to the second terminal based on the information broadcast by the second terminal.

102. The first terminal negotiates, with the second terminal by using the first wireless connection, information required for establishing a second wireless connection.

During specific implementation, after determining that the first terminal has established the first wireless connection to the second terminal, the first terminal first obtains the capability information of the second terminal and determines that the second terminal supports the second wireless connection, and then negotiates, with the second terminal by using the first terminal, the information required for establishing the second wireless connection.

If the second wireless connection is Bluetooth, the information required for establishing the second wireless connection includes a MAC address of the first terminal and a MAC address of the second terminal.

If the second wireless connection is a Wi-Fi P2P connection or a Wi-Fi AP connection, the information required for establishing the second wireless connection includes a first information set and a MAC address of the second terminal. The first information set includes a wireless local area network identifier provided by the first terminal, a wireless local area network password provided by the first terminal, and a wireless local area network frequency provided by the first terminal, so that the second terminal receives the first information set, and accesses, based on the first information set, a wireless local area network provided by the first terminal.

If accessing a same router, the first terminal and the second terminal may perform data transmission with each other through forwarding of the router, and the information required for establishing the second wireless connection includes an IP address of the first terminal and an IP address of the second terminal.

103. The first terminal establishes the second wireless connection to the second terminal based on the information required for establishing the second wireless connection.

Specifically, the first terminal invokes, based on the negotiated information, a module corresponding to the second wireless connection to establish the second wireless connection. If the second wireless connection is Bluetooth, the first terminal invokes a Bluetooth module to establish a Bluetooth connection to the second terminal. If the second wireless connection is the Wi-Fi P2P connection or the Wi-Fi AP connection, and the first terminal is a network providing party, the second terminal accesses, based on the negotiated information, the wireless local area network provided by the first terminal. Certainly, if a result obtained after the first terminal negotiates with the second terminal is that the second terminal is a network providing party, the first terminal accesses, based on the negotiated information, a wireless local area network provided by the second terminal. If accessing a same router, the first terminal and the second terminal may perform data transmission with each other through forwarding of the router. The first terminal sends a packet together with the IP address of the second terminal to the router, and the router receives the data and forwards the packet to the second terminal based on the IP address of the second terminal.

104. The first terminal performs data transmission with the second terminal by using the second wireless connection.

Figure 5A:
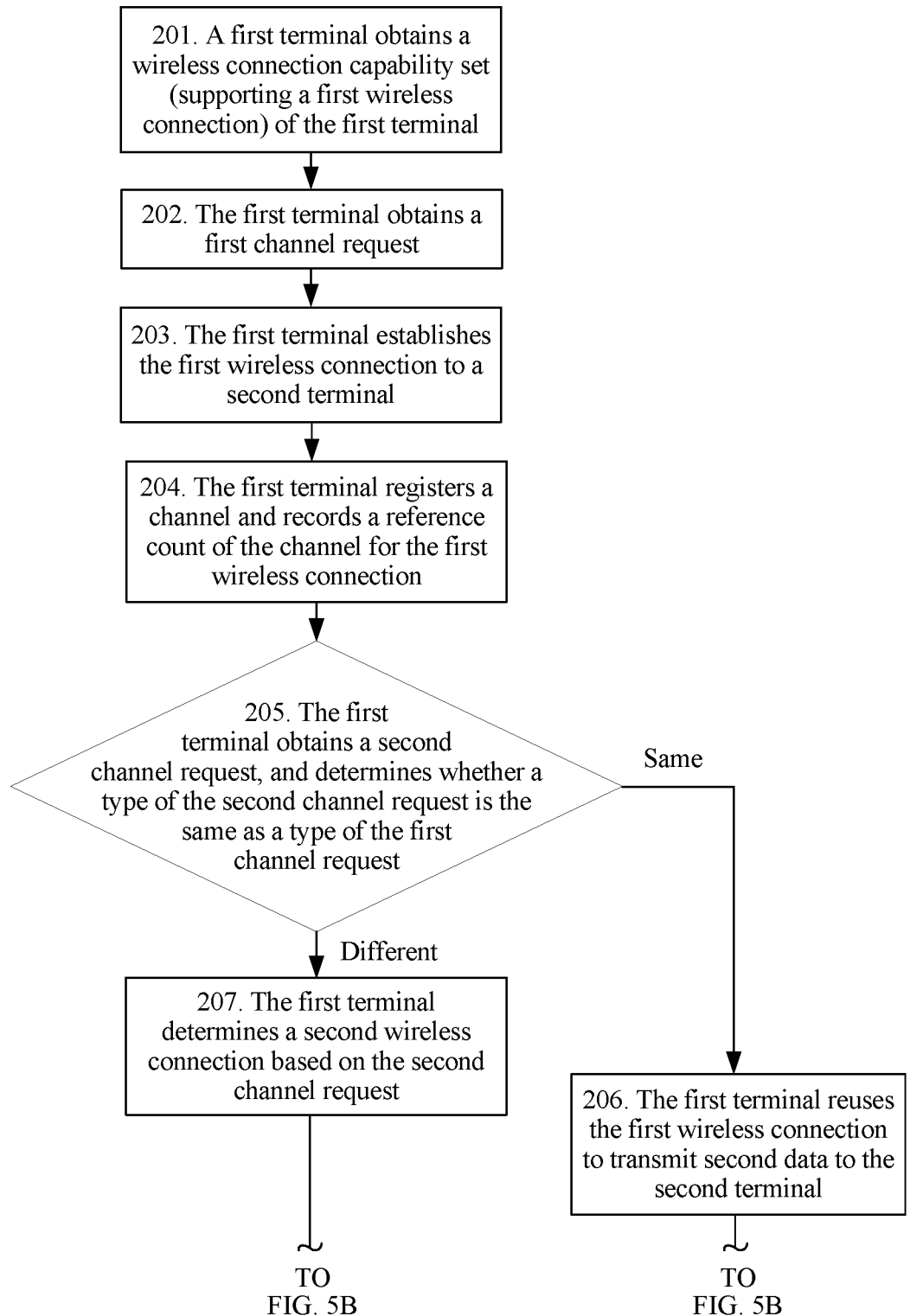
FIG. 5A and FIG. 5B is a flowchart of another wireless connection switching method according to an embodiment of this application.
Figure 5B:
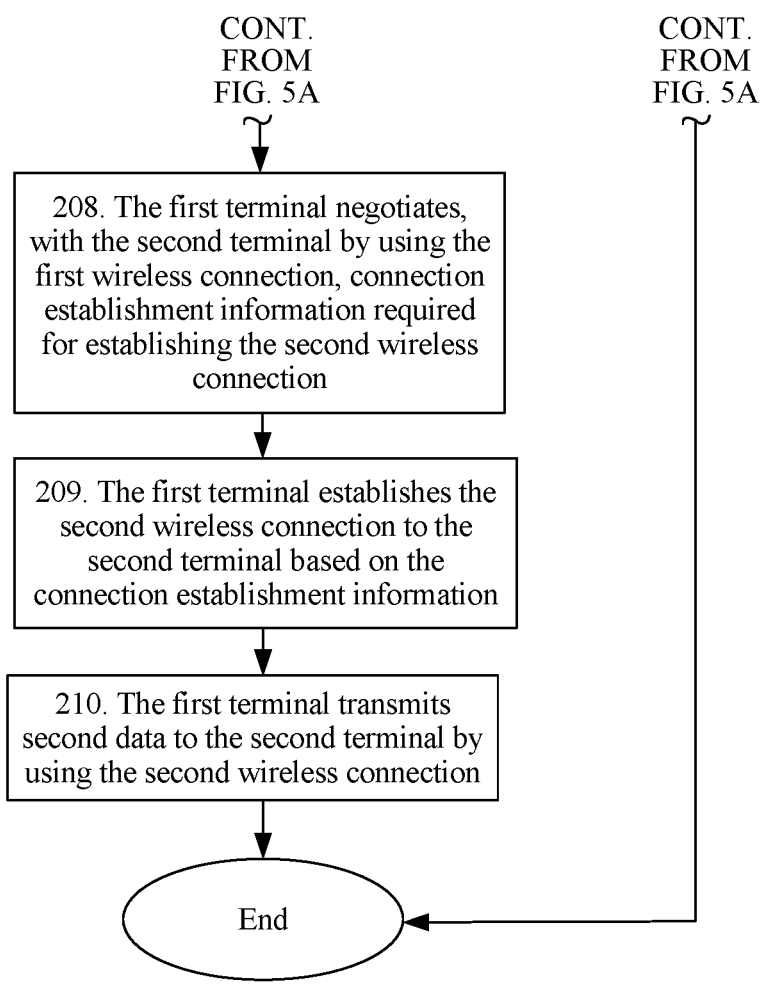

An embodiment of this application further provides a flowchart of a wireless connection switching method. As shown in FIG. 5A and FIG. 5B, the method may include the following steps.

201. A first terminal obtains a wireless connection capability set of the first terminal.

During specific implementation, the first terminal determines a wireless connection mode supported by the first terminal, and determines the wireless connection capability set of the first terminal based on the wireless connection mode supported by the first terminal. For example, the wireless connection capability set includes BLE, Wi-Fi direct, Wi-Fi station, or the like.

In some implementations, the first terminal may invoke a corresponding interface to determine whether the first terminal supports a specific wireless connection mode. For example, the first terminal invokes a Bluetooth interface. If "true" is returned, it indicates that the first terminal supports Bluetooth. If "false" is returned, it indicates that the first terminal does not support Bluetooth.

It should be noted that the Bluetooth module 21 is hardware, and needs to rely on software to function. The software includes a driver of a Bluetooth chip, a Bluetooth protocol stack in a mobile phone system, and an application programming interface related to the Bluetooth chip. The Bluetooth interface herein is the application programming interface.

202. The first terminal obtains a first channel establishment request.

Specifically, before the first terminal transmits first data to a second terminal by using a first application program, the first application program triggers the first channel establishment request, and the first terminal obtains the first channel establishment request. The first channel establishment request may be a request of a resource type, a request of an InstantMessage type, a request of a token type, or a request of a stream type.

203. The first terminal establishes a first wireless connection to a second terminal.

During specific implementation, the first terminal determines the first wireless connection based on a type of the first channel establishment request. Then, the first terminal queries the wireless connection capability set of the first terminal to determine that the first terminal supports the first wireless connection.

Subsequently, the second terminal broadcasts a MAC address, capability information, a device name, and other information of the second terminal. The first terminal obtains, through scanning, the second terminal that is in a broadcasting state, performs a device discovery process with the second terminal, obtains the information broadcast by the second terminal, and sends a MAC address, a device name, and other information of the first terminal to the second terminal.

The first terminal may determine, based on the capability information of the second terminal, whether the second terminal supports the first wireless connection, and can establish the first wireless connection to the second terminal based on the MAC address of the second terminal only after determining that the second terminal supports the initial connection.

204. The first terminal registers a channel and records a reference count of the channel.

After establishing the wireless connection, the first terminal may register the established wireless connection in a memory, and simultaneously record the two parties of the wireless connection. In addition, the first terminal may further record the reference count of the channel (namely, the wireless connection), namely, a quantity of application programs that transmit data by using the wireless connection. For example, a wireless channel between the first terminal and the second terminal is a Bluetooth channel 1. A reference count of the Bluetooth channel 1 is simultaneously recorded as 1. In other words, only one application program currently uses the Bluetooth channel.

205. The first terminal obtains a second channel establishment request, and determines whether a type of the first channel establishment request is the same as a type of the second channel establishment request.

Specifically, when the first terminal needs to transmit second data to the second terminal by using a second application program, the second application program initiates the second channel establishment request. The first data is different from the second data. The first application program may be the same as or may be different from the second application program. The type of the first channel establishment request may be the same as or may be different from the type of the second channel establishment request.

If the type of the first channel establishment request is the same as the type of the second channel establishment request, step 206 is performed; or if the type of the first channel establishment request is different from the type of the second channel establishment request, step 207 is performed.

206. The first terminal reuses the first wireless connection to transmit second data to the second terminal.

When the type of the first channel establishment request is the same as the type of the second channel establishment request, in other words, the first channel establishment request and the second channel establishment request require a same physical channel, the established first wireless connection may be reused to transmit the second data, or a wireless connection that is of a same type as the first wireless connection may be negotiated by using the first wireless connection, to transmit the second data. For example, the first terminal negotiates a new socket with the second terminal by using the existing first wireless connection, and transmits the second data by using the socket.

During specific implementation, the first terminal may negotiate, with the second terminal by using the first wireless connection, information required for establishing a third wireless connection, and establish the third wireless connection to the second terminal. The first wireless connection and the third wireless connection are wireless connections of a same type.

207. The first terminal determines a second wireless connection based on the second channel establishment request.

Specifically, the first terminal determines, in the wireless connection capability set, a wireless connection that matches the type of the second channel establishment request as the second wireless connection. In other words, the second wireless connection may be determined based on the type of the channel establishment request initiated by the application program. For example, information of a relatively small byte, such as "short message", may be transmitted by using a wireless connection with short establishment time and low power consumption, for example, BLE. Data of a relatively large byte, such as "file" or "picture", may be transmitted by using a wireless connection with a relatively high transmission rate, for example, P2P.

208. The first terminal negotiates, with the second terminal by using the first wireless connection, information required for establishing the second wireless connection.

During specific implementation, specific negotiation processes of the first terminal and the second terminal are different due to different types of second wireless connections, and may specifically include the following several processes:

1. The second wireless connection is a Bluetooth connection.

The first terminal sends a first MAC address to the second terminal, and receives a second MAC address sent by the second terminal. The first MAC address is the MAC address of the first terminal, and the second MAC address is the MAC address of the second terminal.

Herein, the information required for establishing the second wireless connection is the MAC address of the first terminal and the MAC address of the second terminal.

2. The second wireless connection is a P2P connection or an AP hotspot connection.

The first terminal negotiates with the second terminal by using the first wireless connection, to determine that the first terminal is a first communications party, and the second terminal is a second communications party. In some embodiments, the first communications party may be "network providing party", and the second communications party may be "network access party".

Subsequently, the first terminal sends a first information set to the second terminal by using the first wireless connection. The first information set includes a wireless local area network identifier provided by the first terminal, a wireless local area network password provided by the first terminal, and a wireless local area network frequency provided by the first terminal, so that the second terminal receives the first information set, and accesses, based on the first information set, a wireless local area network provided by the first terminal. In some embodiments, the wireless local area network provided by the first terminal is a wireless network provided by a GO in a hotspot or a wireless network provided by a router accessed by a GO in P2P. The wireless local area network identifier may be a wireless local area network SSID, and the wireless local area network password may be a password for accessing the wireless local area network.

In addition, the first terminal receives a second MAC address sent by the second terminal. The second MAC address is the MAC address of the second terminal.

In some embodiments, the first terminal negotiates with the second terminal by using the first wireless connection, to determine that the second terminal is "network providing party", and the second terminal is "network access party".

The first terminal receives, by using the first wireless connection, a second information set sent by the second terminal. The second information set includes a wireless local area network identifier provided by the second terminal, a wireless local area network password provided by the second terminal, and a wireless local area network frequency provided by the second terminal. In addition, the first terminal sends a first MAC address to the second terminal, and the first MAC address is the MAC address of the first terminal.

3. In a Wi-Fi station mode, the first terminal performs wireless communication with the second terminal through forwarding of a router.

The first terminal performs network segment negotiation with the second terminal by using the first wireless connection, to be specific, exchanges respective network segment information with the second terminal by using the first wireless connection, to determine whether the first terminal and the second terminal are in a same network segment.

If the first terminal determines that the first terminal and the second terminal are in a same network segment, the first terminal sends a first IP address to the second terminal by using the first wireless connection, and receives, by using the first wireless connection, a second IP address sent by the second terminal. The first IP address is an IP address of the first terminal, and the second IP address is an IP address of the second terminal. Herein, the information required for establishing the second wireless connection is the IP address of the first terminal and the IP address of the second terminal.

For example, a terminal 1 sends network segment information of the terminal 1 to a terminal 2, and the terminal 2 receives the network segment information sent by the terminal 1, and determines whether the received network segment information is the same as network segment information of the terminal 2. If the received network segment information is the same as the network segment information of the terminal 2, the terminal 2 returns acknowledgement information. After receiving the acknowledgement information returned by the terminal 2, the terminal 1 sends an IP address of the terminal 1 to the terminal 2. After receiving the IP address sent by the terminal 1, the terminal 2 returns an IP address of the terminal 2 to the terminal 1. In this way, after learning the respective IP addresses, the terminal 1 and the terminal 2 may communicate with each other in the Wi-Fi station mode. To be specific, the terminal 1 and the terminal 2 add the respective IP addresses to data sent to the router, so that the router forwards the data based on the IP addresses in the data.

209. The first terminal establishes the second wireless connection to the second terminal based on the information required for establishing the second wireless connection.

Similarly, connection establishment processes of the first terminal and the second terminal are different due to different types of second wireless connections, and may specifically include the following several processes:

1. The second wireless connection is the Bluetooth connection.

The first terminal determines a paging moment based on the second MAC address, and sends a first paging message to the second terminal at the paging moment, so that the second terminal sends a first paging response to the first terminal after listening to and obtaining the paging message.

The first terminal receives the first paging response, and sends a second paging message to the second terminal, so that the second terminal sends a second paging response to the first terminal after receiving the second paging message. The second paging message is used to indicate the first MAC address.

The first terminal receives the second paging response, and establishes the second wireless connection to the second terminal.

2. The second wireless connection is the P2P connection or the AP hotspot connection.

In some embodiments, the first terminal negotiates with the second terminal by using the first wireless connection, to determine that the first terminal is a first communications party, and the second terminal is a second communications party. The second terminal accesses, based on the wireless local area network identifier provided by the first terminal, the wireless local area network password provided by the first terminal, and the wireless local area network frequency provided by the first terminal, the wireless local area network provided by the first terminal. The first terminal identifies the second terminal based on the MAC address of the second terminal that is returned by the second terminal. In this way, the first terminal establishes the P2P connection or the AP hotspot connection to the second terminal.

In some other embodiments, the first terminal negotiates with the second terminal by using the first wireless connection, to determine that the first terminal is a second communications party, and the second terminal is a first communications party. The first terminal accesses, based on the wireless local area network identifier provided by the second terminal, the wireless local area network password provided by the second terminal, and the wireless local area network frequency provided by the second terminal, the wireless local area network provided by the second terminal. The second terminal identifies the first terminal based on the MAC address of the first terminal that is returned by the first terminal. In this way, the first terminal establishes the P2P connection or the AP hotspot connection to the second terminal.

3. In the Wi-Fi station mode, the first terminal performs data communication with the second terminal through forwarding of the router.

The first terminal establishes the second wireless connection to the second terminal based on the first IP address and the second IP address. The first IP address is the IP address of the first terminal, and the second IP address is the IP address of the second terminal.

In some embodiments of this application, the second wireless connection is the Wi-Fi P2P connection. A terminal 11 that initiates the Wi-Fi P2P connection sends a request message to a terminal 12 by using an existing wireless connection (for example, the first wireless connection). The request message indicates a role assignment policy: The first terminal 11 is "GO", and the terminal 2 is "GC". The terminal 12 receives the request message. If approving of the role assignment policy requested by the terminal 11, the terminal 12 returns an acknowledgement message by using the existing wireless connection. The terminal 11 receives, by using the existing wireless connection, the acknowledgement message returned by the terminal 12. Subsequently, the terminal 11 returns, to the terminal 12 by using the existing wireless connection, a P2P password, an SSID of a wireless network accessed by the terminal 11, and a frequency of the wireless network accessed by the terminal 11. After receiving the information, the terminal 12 returns a MAC address of the terminal 12 to the terminal 11 by using the existing wireless connection. Herein, the negotiated information required for establishing the second wireless connection is the P2P password, the SSID of the wireless network accessed by the terminal 11, the frequency of the wireless network accessed by the terminal 11, and the MAC address of the terminal 12. In this way, the terminal 12 can access, based on the received information, the network provided by the terminal 11, and simultaneously the terminal 11 can identify the terminal 12 based on the received MAC address of the terminal 12. In this way, the terminal 11 establishes a P2P channel with the terminal 12, and communicates with the terminal 12 by using the P2P channel. The wireless network accessed by the terminal 11 is a wireless network provided by a router accessed by the terminal 11, and may be a wireless network provided by the network access device 13 in FIG. 2.

If the terminal 12 disapproves of the role assignment policy requested by the terminal 11, the terminal 12 may return, by using the existing wireless connection, a role assignment policy of which the terminal 12 approves, and the role assignment policy may be that the terminal 12 is "GO", and the terminal 11 is "GC". The terminal 11 receives the role assignment policy sent by the terminal 12, If approving of the role assignment policy, the terminal 11 returns an acknowledgement message to the terminal 12 by using the existing wireless connection. The terminal 11 receives, by using the existing wireless connection, the acknowledgement message returned by the terminal 12. Subsequently, the terminal 12 returns, to the terminal 11 by using the existing wireless connection, a P2P password, an SSID of a wireless network accessed by the terminal 12, and a frequency of the wireless network accessed by the terminal 2. In this way, the terminal 11 can access, based on the received information, the network provided by the terminal 12, to be specific, establish a P2P channel with the terminal 12, and communicate with the terminal 12 by using the P2P channel. In addition, the terminal 11 may send a MAC address of the terminal 11 to the terminal 12 by using the existing wireless connection, so that the terminal 12 can identify the terminal 11 based on the MAC address of the terminal 11 after the terminal 11 accesses the network provided by the terminal 12. The wireless network accessed by the terminal 12 is a wireless network provided by a router accessed by the terminal 12.

210. The first terminal transmits second data to the second terminal by using the second wireless connection.

In some embodiments of this application, the second wireless connection is the Wi-Fi AP connection. Similar to the Wi-Fi P2P connection, before communicating with each other in a Wi-Fi AP hotspot mode, two terminals first perform role negotiation with each other by using an existing wireless connection (for example, the first wireless connection), to determine which terminal is "sharing party", namely, the foregoing "network providing party", and which terminal is "shared party", namely, the foregoing "network access party". After the roles are determined through negotiation, "sharing party" provides a hotspot password, a hotspot SSID, and a hotspot frequency for "shared party" by using the existing wireless connection. "Shared party" returns a MAC address of "shared party" to "sharing party" by using the existing wireless connection, so that "sharing party" identifies "shared party". Subsequently, "shared party" accesses, based on the received hotspot password, hotspot SSID, and hotspot frequency, a wireless network provided by "sharing party". To be specific, an AP hotspot channel between the two parties is established, and "sharing party" may perform data transmission with "shared party" by using the AP hotspot channel. Herein, the negotiated information required for establishing the second wireless connection is the hotspot password, the hotspot SSID, the hotspot frequency, and the MAC address of "shared party".

In some embodiments of this application, after step 107, the first terminal queries a reference count of the first wireless connection. If the reference count of the first wireless connection is 0, the first terminal releases the first wireless connection, and gives a prompt that the wireless connection has been switched. For example, the first terminal gives a prompt that "the first wireless connection between the first terminal and the second terminal is changed to the second wireless connection". During specific implementation, the first terminal may use the display unit 2301 to display text information: "the first wireless connection between the first terminal and the second terminal is changed to the second wireless connection", to give a user a prompt that the wireless connection to the second terminal is changed; or use the loudspeaker 232 to play voice information: "the first wireless connection between the first terminal and the second terminal is changed to the second wireless connection", to give a user a prompt that the wireless connection to the second terminal is changed.

This application further provides a data frame. A first terminal uses the data frame to negotiate, with a second terminal by using a first wireless connection, information required for establishing a wireless connection. The data frame is different from a prior-art data frame used when the first terminal negotiates, with the second terminal in a device discovery process, the information required for establishing the second wireless connection. In this embodiment of this application, the first terminal uses a data frame in a type-length-value (type-length-value, TLV) format when negotiating, with the second terminal by using the first wireless connection, the information required for establishing the second wireless connection. The data frame includes a type field, a length field, and a data field. The type field is used to indicate a type of the data frame, for example, one of P2P, Wi-Fi station, AP, BR, or BLE. The length field behind the type field is used to indicate a byte length of the type field.

The data field includes a plurality of TLV indication information segments. Each TLV indication information segment includes a type field, a length field, and a data field. The type field in the TLV indication information segment is used to indicate a wireless connection type corresponding to the TLV indication information segment. The wireless connection type may be one of P2P, Wi-Fi station, AP, BR, or BLE. Each data field in the TLV indication information segments is used to indicate one piece of information that needs to be sent to the second terminal, for example, a MAC address, an IP address, or the like.

Figure 6:
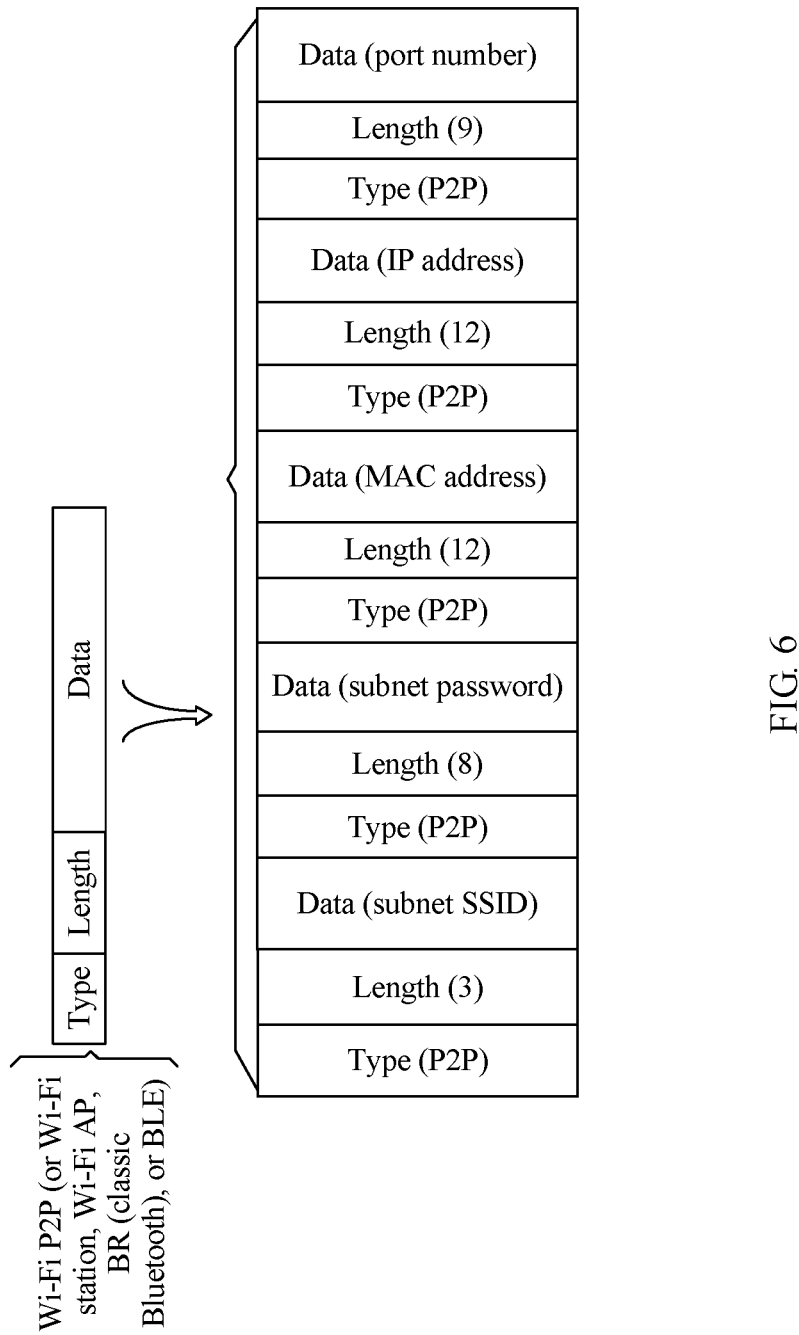
FIG. 6 is a schematic structural diagram of a data frame for negotiating information required for establishing a wireless connection according to an embodiment of this application.

For example, as shown in FIG. 6, information required for establishing a P2P connection is negotiated, the first terminal is "GO", and the second terminal is "GC". The type field in the data frame sent by the first terminal to the second terminal indicates that the wireless connection type is P2P, and the data field includes a plurality of groups of TLV indication information: a type field is P2P, and a data field is a wireless local area network SSID provided by the first terminal; a type field is P2P, and a data field is a wireless local area network password; a type field is P2P, and a data field is a MAC address of the first terminal; a type field is P2P, and a data field is an IP address of the first terminal; and a type field is P2P, and a data field is a port number of the first terminal.

Similarly, if type fields in the TLV indication information segments each indicate that the wireless connection type is AP, and the first terminal is "network providing party", data fields in the TLV indication information segments may include a wireless local area network SSID and a wireless local area network password that are provided by the first terminal, and a MAC address of the first terminal. If type fields in the TLV indication information segments each indicate that the wireless connection type is Wi-Fi station, data fields in the TLV indication information segments may include an IP address, a port number, and a MAC address of the first terminal. If type fields in the TLV indication information segments each indicate that the wireless connection type is BR or BLE, data fields in the TLV indication information segments may include a MAC address of the first terminal.

The foregoing mainly describes the solutions provided in the embodiments of this application from the perspective of interaction between network elements. It may be understood that to implement the foregoing functions, the terminal includes corresponding hardware structures and/or software modules for implementing the functions. A person skilled in the art should be easily aware that the algorithm steps in the examples described with reference to the embodiments disclosed in this specification can be implemented in a form of hardware or a combination of hardware and computer software in this application. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of this application.

In the embodiments of this application, the terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of this application is an example and is merely logical function division, and may be other division during actual implementation.

Figure 7:
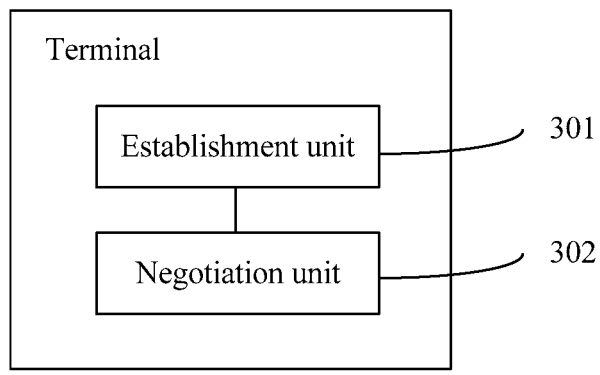
FIG. 7 is another schematic composition diagram of a terminal according to an embodiment of this application.

When each function module is obtained through division based on each corresponding function, FIG. 7 is a possible schematic composition diagram of the terminal in the foregoing embodiments. As shown in FIG. 7, the terminal may include an establishment unit 302 and a negotiation unit 303.

The establishment unit 301 is configured to support the terminal in performing step 101 and step 103 in the data processing method shown in FIG. 4 and step 203 and step 209 in the data processing method shown in FIG. 5A and FIG. 5B.

The negotiation unit 302 is configured to support the terminal in performing step 103 in the data processing method shown in FIG. 4 and step 201 and step 208 in the data processing method shown in FIG. 5A and FIG. 5B.

Figure 8:
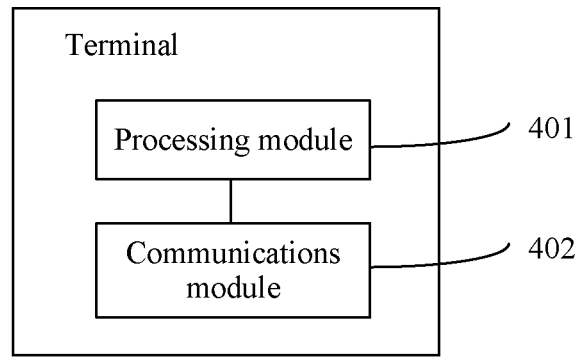
FIG. 8 is another schematic composition diagram of a terminal according to an embodiment of this application.

When an integrated unit is used, FIG. 8 is another possible schematic composition diagram of the terminal in the foregoing embodiments. As shown in FIG. 8, the terminal includes a processing module 401 and a communications module 402.

The processing module 401 is configured to control and manage an action of the terminal, and the communications module 402 is configured to support the terminal in communicating with another network entity. The terminal may further include a storage module 403, configured to store program code and data of the terminal.

As shown in FIG. 3, the processing module 401 may be a processor or a controller, and is further integrated with wireless modules such as a Bluetooth module, a Wi-Fi module, and an NFC module. The processing module 401 may implement or execute various example logical blocks, modules, and circuits that are described with reference to the content disclosed in the present invention. Alternatively, the processor may be a combination for implementing a computing function, such as a combination including one or more microprocessors or a combination of a DSP and a microprocessor. The communications module 402 may be a communications interface, or the like. The storage module 403 may be a memory.

As shown in FIG. 3, the processor 21 is configured to support the terminal in performing steps 101 to 104 in FIG. 4 and steps 201 to 210 in FIG. 5A and FIG. 5B.

Figure 9:
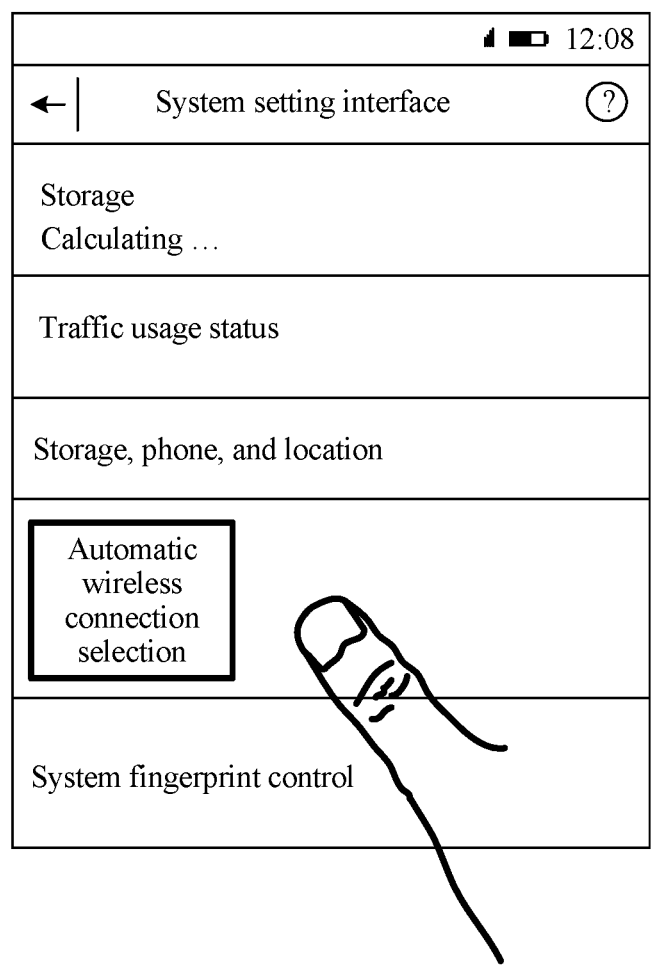
FIG. 9 is a schematic diagram of a system setting page of a terminal according to an embodiment of this application.

In some embodiments of this application, a new wireless connection may be further established based on selection of a user. During specific implementation, as shown in FIG. 9, an "automatic wireless connection selection" function button may be added to a system setting interface of a terminal. After the user selects the "automatic wireless connection selection" function button in the system setting interface shown in FIG. 9, the terminal may determine, based on a type of data to be transmitted by an application program that currently requests to establish a channel (which may alternatively be a type of a channel establishment request triggered by the application program), a wireless connection mode that matches the type of the to-be-transmitted data, and display the wireless connection type that matches the type of the to-be-transmitted data. For example, "candidate wireless connection interface" may be displayed, and the interface includes the wireless connection type that matches the type of the to-be-transmitted data, for example, Bluetooth, Wi-Fi P2P, BLE, or Wi-Fi AP.

Figure 10:
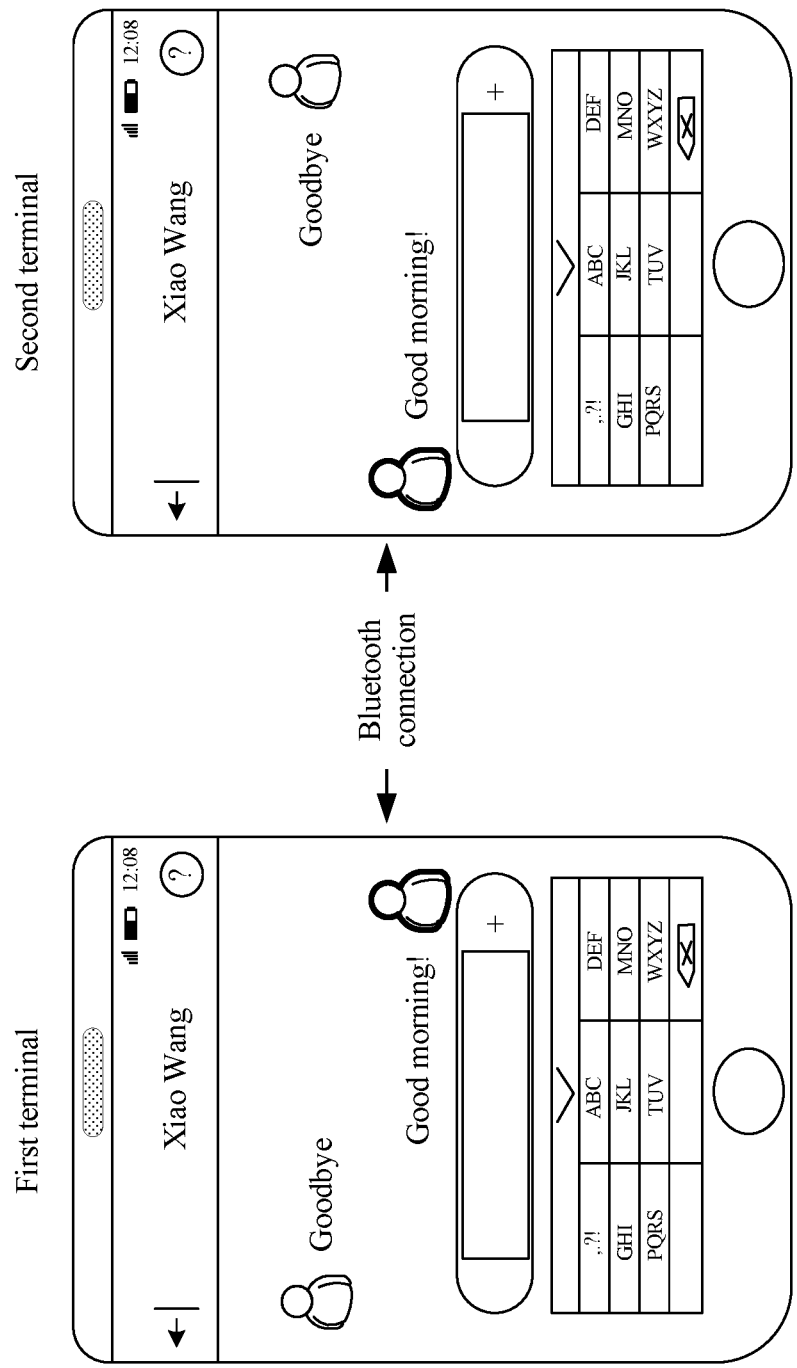
FIG. 10 is a schematic diagram of transmitting data by a terminal by using a Bluetooth connection according to an embodiment of this application.

For example, referring to FIG. 10, a first terminal establishes a Bluetooth connection to a second terminal, and the first terminal may transmit, to the second terminal by using the established Bluetooth connection, information of a relatively small byte, for example, information "Good morning!" that is to be sent by a user of the first terminal to the second terminal by using WeChat.

Figure 11:
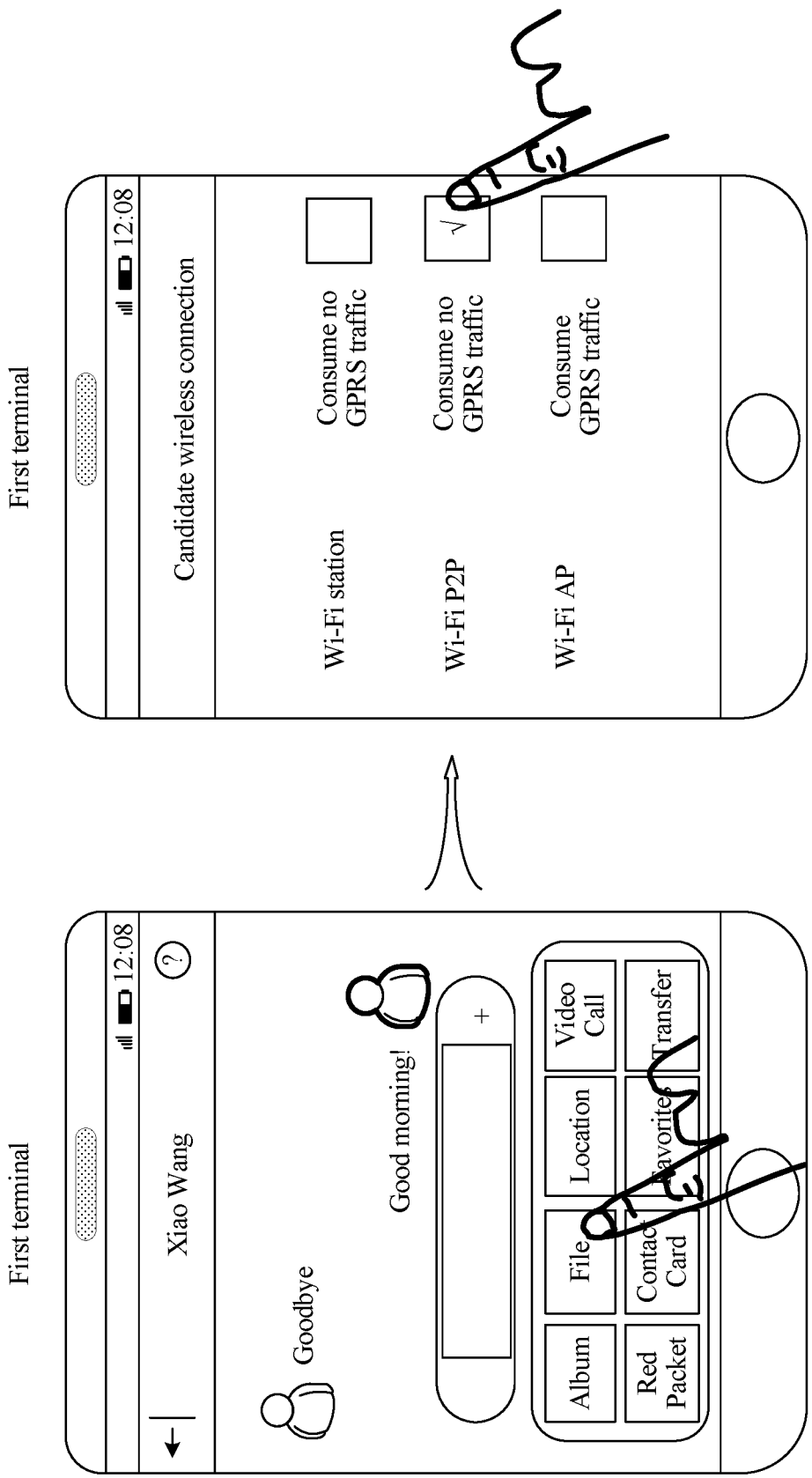
FIG. 11 is a schematic diagram of a candidate wireless connection interface displayed by a terminal according to an embodiment of this application.

It is assumed that the first terminal enables an "automatic wireless selection" function. Referring to FIG. 11, when the user of the first terminal needs to send a file "2017 working plan" to the second terminal by using WeChat, the first terminal displays "candidate wireless connection interface". The interface includes a wireless connection mode suitable to transmit a file of a relatively large byte, for example, a Wi-Fi station mode (provided that the first terminal and the second terminal access a same router), a Wi-Fi AP mode, or a Wi-Fi P2P mode, and gives a prompt of a traffic usage status of each wireless connection mode. For example, traffic usage statuses of the Wi-Fi station mode and the Wi-Fi P2P mode are "consume no GPRS traffic", and a traffic usage status of the Wi-Fi AP mode is "consume GPRS traffic". The user may select any wireless connection mode through tapping in "candidate wireless connection interface". The first terminal may determine, based on the tap operation of the user on a screen of the first terminal, the wireless connection mode selected by the user, and establish a new wireless connection to the second terminal. For example, if the user selects Wi-Fi P2P, the first terminal establishes a Wi-Fi P2P connection to the second terminal, and then transmits the file "2017 working plan" to the second terminal by using the Wi-Fi P2P.

Figure 12:
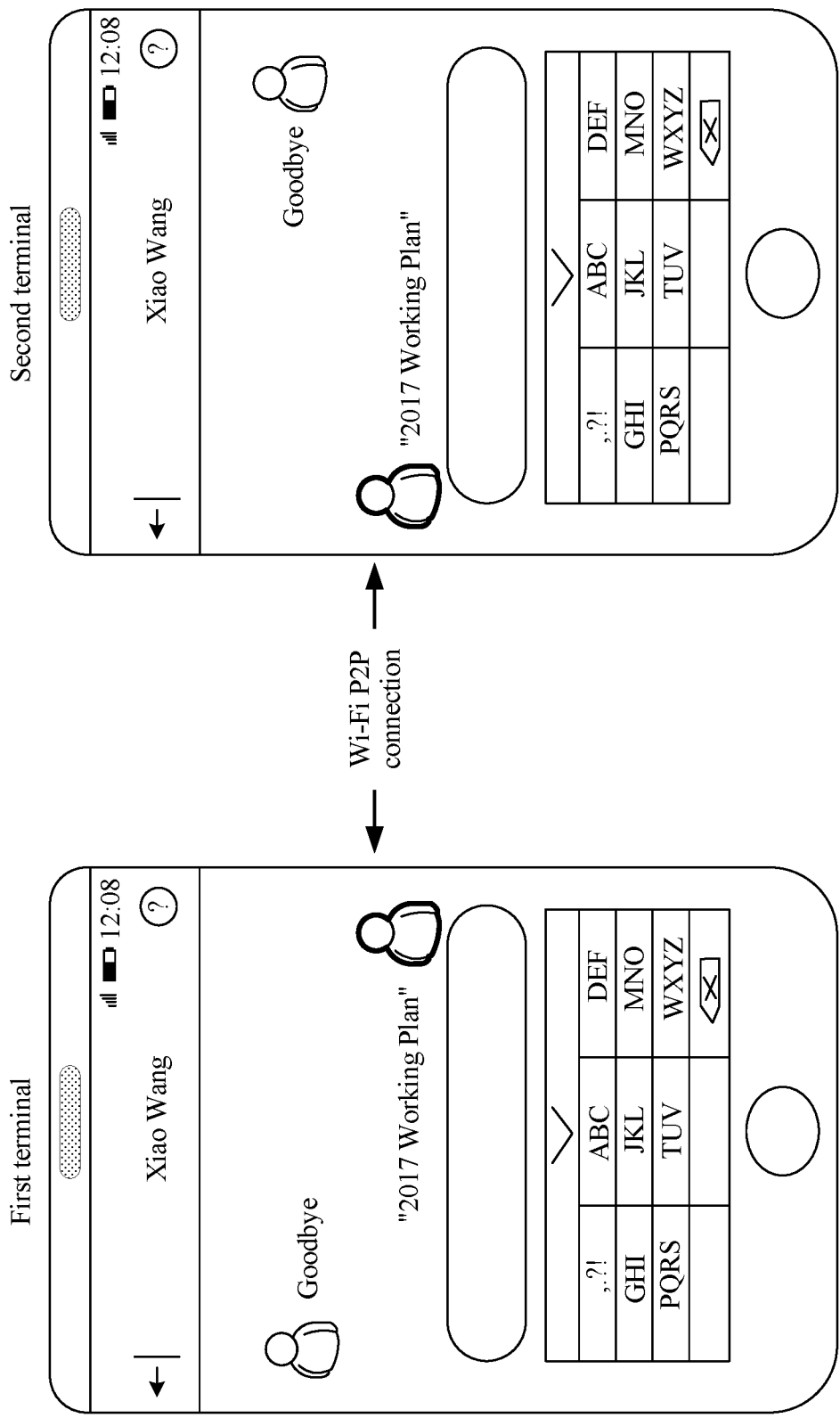
FIG. 12 is a schematic diagram of transmitting data by a terminal by using a newly established wireless connection according to an embodiment of this application.

Subsequently, referring to FIG. 12, the first terminal establishes the Wi-Fi P2P connection to the second terminal, and the first terminal transmits the file "2017 working plan" to the second terminal by using the Wi-Fi P2P connection.

Based on the foregoing descriptions of implementations, a person skilled in the art may clear understand that for the purpose of convenient and brief description, merely division of the foregoing function modules is used as an example for illustration. During actual application, the foregoing functions can be allocated to different function modules for implementation based on a requirement. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, in other words, may be located in one place, or may be distributed on a plurality of different places. Some or all of the units may be selected based on an actual requirement to achieve the objectives of the solutions of the embodiments.

In addition, the function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless connection switching method, comprising:
   establishing, by a first terminal, a first wireless connection to a second terminal;
   negotiating, by the first terminal with the second terminal by using the first wireless connection, information required for establishing a second wireless connection; and
   establishing, by the first terminal, the second wireless connection to the second terminal based on the information required for establishing the second wireless connection; and, wherein if the second wireless connection is a wireless local area network WLAN connection, the negotiating, by the first terminal with the second terminal by using the first wireless connection, information required for establishing a second wireless connection specifically comprises:
   sending, by the first terminal, a first information set to the second terminal by using the first wireless connection, wherein the first information set comprises a wireless local area network identifier provided by the first terminal, a wireless local area network password provided by the first terminal, and a wireless local area network frequency provided by the first terminal, so that the second terminal receives the first information set, and accesses, based on the first information set, a wireless local area network provided by the first terminal; and
   receiving, by the first terminal by using the first wireless connection, a second MAC address sent by the second terminal, wherein the second MAC address is a MAC address of the second terminal; and, wherein
   the information required for establishing the second wireless connection comprises the first information set and the second MAC address, and the establishing, by the first terminal, the second wireless connection to the second terminal based on the information required for establishing the second wireless connection specifically comprises:
   establishing, by the first terminal, the second wireless connection to the second terminal after acknowledging, based on the second MAC address, that the second terminal accesses the wireless local area network provided by the first terminal.

2. The method according to claim 1, wherein the method further comprises:
   obtaining, by the first terminal, capability information of the second terminal, and determining, based on the capability information, that the second terminal supports the second wireless connection.

3. The method according to claim 1, wherein the method further comprises:
   determining, by the first terminal, a type of the second wireless connection based on a user indication or an attribute of to-be-transmitted data, wherein the attribute of the to-be-transmitted data comprises a data type of the to-be-transmitted data and a byte size of the to-be-transmitted data.

4. The method according to claim 1, wherein if the second wireless connection is Bluetooth, the negotiating, by the first terminal with the second terminal by using the first wireless connection, information required for establishing a second wireless connection specifically comprises:
   sending, by the first terminal, a first MAC address to the second terminal by using the first wireless connection, and receiving, by using the first wireless connection, a second MAC address sent by the second terminal, wherein the first MAC address is a MAC address of the first terminal, and the second MAC address is a MAC address of the second terminal; and
   the information required for establishing the second wireless connection comprises the first MAC address and the second MAC address, and the establishing, by the first terminal, the second wireless connection to the second terminal based on the information required for establishing the second wireless connection specifically comprises:
   establishing, by the first terminal, the second wireless connection to the second terminal based on the first MAC address and the second MAC address.

5. The method according to claim 1, wherein if the second wireless connection is a WLAN connection, the negotiating, by the first terminal with the second terminal by using the first wireless connection, information required for establishing a second wireless connection specifically comprises:
   if acknowledging, based on the first wireless connection, that the first terminal and the second terminal are in a same network segment, sending, by the first terminal, a first IP address to the second terminal by using the first wireless connection, and receiving, by using the first wireless connection, a second IP address sent by the second terminal, wherein the first IP address is an IP address of the first terminal, and the second IP address is an IP address of the second terminal; and
   the information required for establishing the second wireless connection comprises the first IP address and the second IP address, and the establishing, by the first terminal, the second wireless connection to the second terminal based on the information required for establishing the second wireless connection specifically comprises:
   establishing, by the first terminal, the second wireless connection to the second terminal based on the first IP address and the second IP address.

6. The method according to claim 1, wherein after the establishing, by the first terminal, the second wireless connection to the second terminal based on the information required for establishing the second wireless connection, the method further comprises:
    providing a prompt that the second wireless connection to the second terminal is established.

7. A first terminal, comprising:
    at least one processor; and
    a memory coupled to the at least one processor and storing programming instructions that, when executed by the at least one processor, cause the first terminal to:
    establish a first wireless connection to a second terminal;
    negotiate with the second terminal by using the first wireless connection, information required for establishing a second wireless connection; and
    establish the second wireless connection to the second terminal based on the information required for establishing the second wireless connection; and, wherein if the second wireless connection is a wireless local area network WLAN connection, negotiating, by the first terminal with the second terminal by using the first wireless connection, information required for establishing a second wireless connection specifically comprises:
    sending a first information set to the second terminal by using the first wireless connection, wherein the first information set comprises a wireless local area network identifier provided by the first terminal, a wireless local area network password provided by the first terminal, and a wireless local area network frequency provided by the first terminal, so that the second terminal receives the first information set, and accesses, based on the first information set, a wireless local area network provided by the first terminal; and
    receiving, by using the first wireless connection, a second MAC address sent by the second terminal, wherein the second MAC address is a MAC address of the second terminal; and, wherein
    the information required for establishing the second wireless connection comprises the first information set and the second MAC address, and establishing, by the first terminal, the second wireless connection to the second terminal based on the information required for establishing the second wireless connection specifically comprises:
        establishing, by the first terminal, the second wireless connection to the second terminal after acknowledging, based on the second MAC address, that the second terminal accesses the wireless local area network provided by the first terminal.

8. The first terminal according to claim 7, wherein the memory further stores programming instructions that, when executed by the at least one processor, cause the first terminal to:
    obtain capability information of the second terminal, and determine, based on the capability information, that the second terminal supports the second wireless connection.

9. The first terminal according to claim 7, wherein the memory further stores programming instructions that, when executed by the at least one processor, cause the first terminal to:
    determine a type of the second wireless connection based on a user indication or an attribute of to-be-transmitted data, wherein the attribute of the to-be-transmitted data comprises a data type of the to-be-transmitted data and a byte size of the to-be-transmitted data.

10. The first terminal according to claim 7, wherein if the second wireless connection is Bluetooth, the negotiating, by the first terminal with the second terminal by using the first wireless connection, information required for establishing a second wireless connection specifically comprises:
    sending, by the first terminal, a first MAC address to the second terminal by using the first wireless connection, and receiving, by using the first wireless connection, a second MAC address sent by the second terminal, wherein the first MAC address is a MAC address of the first terminal, and the second MAC address is a MAC address of the second terminal; and
    the information required for establishing the second wireless connection comprises the first MAC address and the second MAC address, and the establishing, by the first terminal, the second wireless connection to the second terminal based on the information required for establishing the second wireless connection specifically comprises:
    establishing, by the first terminal, the second wireless connection to the second terminal based on the first MAC address and the second MAC address.

11. The first terminal according to claim 7, wherein if the second wireless connection is a WLAN connection, the negotiating, by the first terminal with the second terminal by using the first wireless connection, information required for establishing a second wireless connection specifically comprises:
    if acknowledging, based on the first wireless connection, that the first terminal and the second terminal are in a same network segment, sending, by the first terminal, a first IP address to the second terminal by using the first wireless connection, and receiving, by using the first wireless connection, a second IP address sent by the second terminal, wherein the first IP address is an IP address of the first terminal, and the second IP address is an IP address of the second terminal; and
    the information required for establishing the second wireless connection comprises the first IP address and the second IP address, and the establishing, by the first terminal, the second wireless connection to the second terminal based on the information required for establishing the second wireless connection specifically comprises:
    establishing, by the first terminal, the second wireless connection to the second terminal based on the first IP address and the second IP address.

12. The first terminal according to claim 7, wherein the memory further stores programming instructions that, when executed by the at least one processor, cause the first terminal to:
    provide a prompt that the second wireless connection to the second terminal is established.

13. A non-transitory computer-readable storage medium having computer-readable program code stored therein that, in response to execution by a processor of an apparatus, cause the apparatus to perform operations comprising:
    establishing, by a first terminal, a first wireless connection to a second terminal;
    negotiating, by the first terminal with the second terminal by using the first wireless connection, information required for establishing a second wireless connection; and
    establishing, by the first terminal, the second wireless connection to the second terminal based on the information required for establishing the second wireless connection; if the second wireless connection is a wireless local area network WLAN connection, the negotiating, by the first terminal with the second terminal by using the first wireless connection, information required for establishing a second wireless connection specifically comprises:
sending, by the first terminal, a first information set to the second terminal by using the first wireless connection, wherein the first information set comprises a wireless local area network identifier provided by the first terminal, a wireless local area network password provided by the first terminal, and a wireless local area network frequency provided by the first terminal, so that the second terminal receives the first information set, and accesses, based on the first information set, a wireless local area network provided by the first terminal; and
receiving, by the first terminal by using the first wireless connection, a second MAC address sent by the second terminal, wherein the second MAC address is a MAC address of the second terminal; and
the information required for establishing the second wireless connection comprises the first information set and the second MAC address, and the establishing, by the first terminal, the second wireless connection to the second terminal based on the information required for establishing the second wireless connection specifically comprises:
establishing, by the first terminal, the second wireless connection to the second terminal after acknowledging, based on the second MAC address, that the second terminal accesses the wireless local area network provided by the first terminal and, wherein if the second wireless connection is a wireless local area network WLAN connection, the negotiating, by the first terminal with the second terminal by using the first wireless connection, information required for establishing a second wireless connection specifically comprises:
sending, by the first terminal, a first information set to the second terminal by using the first wireless connection, wherein the first information set comprises a wireless local area network identifier provided by the first terminal, a wireless local area network password provided by the first terminal, and a wireless local area network frequency provided by the first terminal, so that the second terminal receives the first information set, and accesses, based on the first information set, a wireless local area network provided by the first terminal; and
receiving, by the first terminal by using the first wireless connection, a second MAC address sent by the second terminal, wherein the second MAC address is a MAC address of the second terminal; and, wherein
the information required for establishing the second wireless connection comprises the first information set and the second MAC address, and the establishing, by the first terminal, the second wireless connection to the second terminal based on the information required for establishing the second wireless connection specifically comprises:
establishing, by the first terminal, the second wireless connection to the second terminal after acknowledging, based on the second MAC address, that the second terminal accesses the wireless local area network provided by the first terminal.

14. The non-transitory computer-readable storage medium according to claim 13, wherein the operations further comprising:
obtaining, by the first terminal, capability information of the second terminal, and determining, based on the capability information, that the second terminal supports the second wireless connection.

15. The non-transitory computer-readable storage medium according to claim 13, wherein the operations further comprising:
determining, by the first terminal, a type of the second wireless connection based on a user indication or an attribute of to-be-transmitted data, wherein the attribute of the to-be-transmitted data comprises a data type of the to-be-transmitted data and a byte size of the to-be-transmitted data.

16. The non-transitory computer-readable storage medium according to claim 13, wherein if the second wireless connection is Bluetooth, the negotiating, by the first terminal with the second terminal by using the first wireless connection, information required for establishing a second wireless connection specifically comprises:
sending, by the first terminal, a first MAC address to the second terminal by using the first wireless connection, and receiving, by using the first wireless connection, a second MAC address sent by the second terminal, wherein the first MAC address is a MAC address of the first terminal, and the second MAC address is a MAC address of the second terminal; and
the information required for establishing the second wireless connection comprises the first MAC address and the second MAC address, and the establishing, by the first terminal, the second wireless connection to the second terminal based on the information required for establishing the second wireless connection specifically comprises:
establishing, by the first terminal, the second wireless connection to the second terminal based on the first MAC address and the second MAC address.

17. The non-transitory computer-readable storage medium according to claim 16, wherein if the second wireless connection is a WLAN connection, the negotiating, by the first terminal with the second terminal by using the first wireless connection, information required for establishing a second wireless connection specifically comprises:
if acknowledging, based on the first wireless connection, that the first terminal and the second terminal are in a same network segment, sending, by the first terminal, a first IP address to the second terminal by using the first wireless connection, and receiving, by using the first wireless connection, a second IP address sent by the second terminal, wherein the first IP address is an IP address of the first terminal, and the second IP address is an IP address of the second terminal; and
the information required for establishing the second wireless connection comprises the first IP address and the second IP address, and the establishing, by the first terminal, the second wireless connection to the second terminal based on the information required for establishing the second wireless connection specifically comprises:
establishing, by the first terminal, the second wireless connection to the second terminal based on the first IP address and the second IP address.

* * * * *